(12) United States Patent
Tobiason

(10) Patent No.: US 6,906,315 B2
(45) Date of Patent: Jun. 14, 2005

(54) HIGH ACCURACY MINIATURE GRATING ENCODER READHEAD USING FIBER OPTIC RECEIVER CHANNELS

(75) Inventor: Joseph D. Tobiason, Woodinville, WA (US)

(73) Assignee: Mitutoyo Corporation, Kawasaki (JP)

( * ) Notice: Subject to any disclaimer, the term of this patent is extended or adjusted under 35 U.S.C. 154(b) by 322 days.

(21) Appl. No.: 10/298,312

(22) Filed: Nov. 15, 2002

(65) Prior Publication Data

US 2004/0011948 A1 Jan. 22, 2004

Related U.S. Application Data

(60) Provisional application No. 60/396,659, filed on Jul. 16, 2002.

(51) Int. Cl.[7] .............................. G01B 9/02; G01D 5/38
(52) U.S. Cl. ............................. 250/237 R; 250/231.16; 356/499
(58) Field of Search ...................... 250/231.13, 231.16, 250/237 R, 237 G, 227.11; 356/498, 499, 600, 616, 617; 341/11, 13, 31

(56) References Cited

U.S. PATENT DOCUMENTS

| | | | |
|---|---|---|---|
| 3,483,389 A | * | 12/1969 | Cronin ....................... 250/566 |
| 4,733,071 A | | 3/1988 | Tokunaga |
| 4,774,494 A | * | 9/1988 | Extance et al. ................ 341/6 |
| 5,808,730 A | | 9/1998 | Danielian et al. |
| 5,909,283 A | | 6/1999 | Eselun |

FOREIGN PATENT DOCUMENTS

| | | |
|---|---|---|
| EP | 1 382 941 A1 | 1/2004 |
| JP | 59173713 | 10/1984 |
| JP | 1272917 | 10/1989 |

OTHER PUBLICATIONS

Cowley, J.M., and Moodie, A.F., "Fourier Images: I—The Point Source," May 1, 1957, *Proc. Phys. Soc. B* 70:486–496.
Patorski, K., "The Self–Imaging Phenomenon and Its Applications," *Progress in Optics,* ed. E. Wolf, 27, 3–108, North Holland, Amsterdam 1989.

* cited by examiner

*Primary Examiner*—Stephone B. Allen
(74) *Attorney, Agent, or Firm*—Christensen O'Connor Johnson Kindness PLLC

(57) ABSTRACT

A fiber optic encoder readhead for sensing the displacement of a scale grating is disclosed. The detector channels of the readhead are fiber optic detector channels having respective phase grating masks. The fiber optic encoder readhead is configured to detect the displacement of a self-image of the scale grating. In various exemplary embodiments, the fiber optic readhead is constructed according to various design relationships that insure a robust signal-to-noise ratio. Accordingly, high levels of displacement signal interpolation may be achieved, allowing sub-micrometer displacement measurements. The fiber optic encoder readhead may be assembled in a particularly accurate and economical manner and may be provided in a package with dimensions on the order of 1–2 millimeters.

46 Claims, 14 Drawing Sheets

HIGH ACCURACY MINIATURE GRATING ENCODER READHEAD USING FIBER OPTIC RECEIVER CHANNELS

CROSS-REFERENCE(S) TO RELATED APPLICATION(S)

This application claims the benefit of U.S. Provisional Application No. 60/396,659, filed Jul. 16, 2002, under the provisions of 35 U.S.C. § 119, the disclosure and drawings of which are incorporated herein by reference.

FIELD OF THE INVENTION

This invention relates generally to displacement sensing optical encoders, and more particularly to an optical encoder utilizing optical fibers as receiver elements to provide an ultra-compact high accuracy system.

BACKGROUND OF THE INVENTION

Various movement or position encoders for sensing linear, rotary or angular movement are currently available. These encoders are generally based on either optical systems, magnetic scales, inductive transducers, or capacitive transducers.

For optical encoders, a number of systems have been developed. One recent system utilizing fewer parts than most previous systems is disclosed in U.S. Pat. No. 5,909,283, to Eselun. The system described in the '283 patent has a grating scale and readhead including a point source (laser diode in readhead), a Ronchi grating or holographic element, and a photodetector array. As described, the point source results in interference fringes having a spacing equal to that of the scale. The interference fringe light is transmitted through the Ronchi grating or holographic element to the photodetector array. The photodetector array is arranged to derive four channels of quadrature signals from the transmitted fringe light. However, the resulting encoder is still of a size that is relatively large or prohibitive for a number of applications.

One system utilizing optical fibers as receivers is disclosed in U.S. Pat. No. 4,733,071, to Tokunaga. The system described in the '071 patent has a code member scale, and an optical sensor head comprising an optical fiber tip light emitter and two optical fiber tip receptors closely arranged along the code member measuring axis. The optical sensor head is rotated (yawed) to adjust phase difference between the two optical fiber tip receptors. However, the accuracy of the resulting encoder is relatively crude.

SUMMARY OF THE INVENTION

The present invention is directed to providing an encoder that overcomes the foregoing and other disadvantages. More specifically, the present invention is directed to an optical encoder that is of extremely small size while providing very high accuracy, in addition to having a number of other desirable features.

A fiber optic encoder readhead for sensing the displacement of a scale grating is disclosed. The readhead includes a light source for transmitting light to the scale grating and detector channels for receiving light from the scale grating. In accordance with one aspect of the invention, the detector channels of the encoder readhead are fiber optic detector channels. Electronic readhead receivers (photodetectors) such as disclosed in the '283 patent suffer limitations in converting the high frequency detector signals associated with high speed scale motion and transmitting those signals over long cables without significant signal loss or interference. In addition, electronic photodetectors and the associated circuit connections contribute to readheads that are too large for many potential encoder applications. It will be appreciated that the fiber optic detector channels of the present invention overcome these limitations.

In accordance with another aspect of the invention, the fiber optic encoder readhead detects the location of a scale grating image using multiple fiber optic detector channels having respective phase grating masks. Optical fiber tip receptors such as those disclosed in the '071 patent have insufficient spatial resolution for fine phase signal discrimination if they have a large diameter, and gather too little light to provide a good signal if they have a small diameter. Thus, their accuracy is limited. It will be appreciated that the fiber optic detector channels of the present invention overcome these and other limitations to provide high accuracy.

In accordance with another aspect of the invention, the scale grating image detected by the multiple fiber optic detector channels is a self-image, also known by other names such as a Talbot image, which provides for relatively robust alignment tolerances and high resolution.

In accordance with another aspect of the invention, the fiber optic encoder readhead is constructed according to a design relationship based on an input aperture size of the fiber optic detector channels, to insure reliable signals and enhanced accuracy.

In accordance with a separate aspect of the invention, the fiber optic detector channels are arranged in balanced pairs, to provide enhanced accuracy.

In accordance with a further aspect of the invention, 3 balanced pairs of fiber optic detector channels are signal processed in a manner that provides enhanced accuracy.

In accordance with a separate aspect of the invention, the light source is provided by an optical fiber, to provide an all-optical readhead, free of all limitations and costs associated with electronic assembly and electronic signals in an encoder readhead.

In accordance with a separate aspect of the invention, the various optical fibers of the fiber optic encoder are selected from various types such that the encoder measurement accuracy is relatively unaffected by bending of the fiber optic readhead cable.

In accordance with a separate aspect of the invention, various embodiments of the fiber optic encoder readhead are constructed in a particularly economical, accurate and compact manner.

In accordance with a separate aspect of the invention, the fiber optic encoder readhead is constructed such that it may be inserted into a standard commercially available fiber optic connector configuration.

In accordance with a separate aspect of the invention, a light deflecting element is provided to deflect the readhead light path between the basic readhead elements and the scale grating, such that the operable mounting orientation of the readhead relative to the scale is changed.

In accordance with separate aspect of the invention, in one embodiment a remote interface box is utilized that contains appropriate electronic light sources and photodetectors that interface with the fiber optics to and from one or more fiber optic readheads according to this invention, and converts received optical signals to a form suitable for further signal processing and readhead position determination.

Hence, the invention overcomes the disadvantages of prior art optical-displacement sensing devices and provides new application possibilities with an ultra-compact, highly accurate, economical and high speed configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
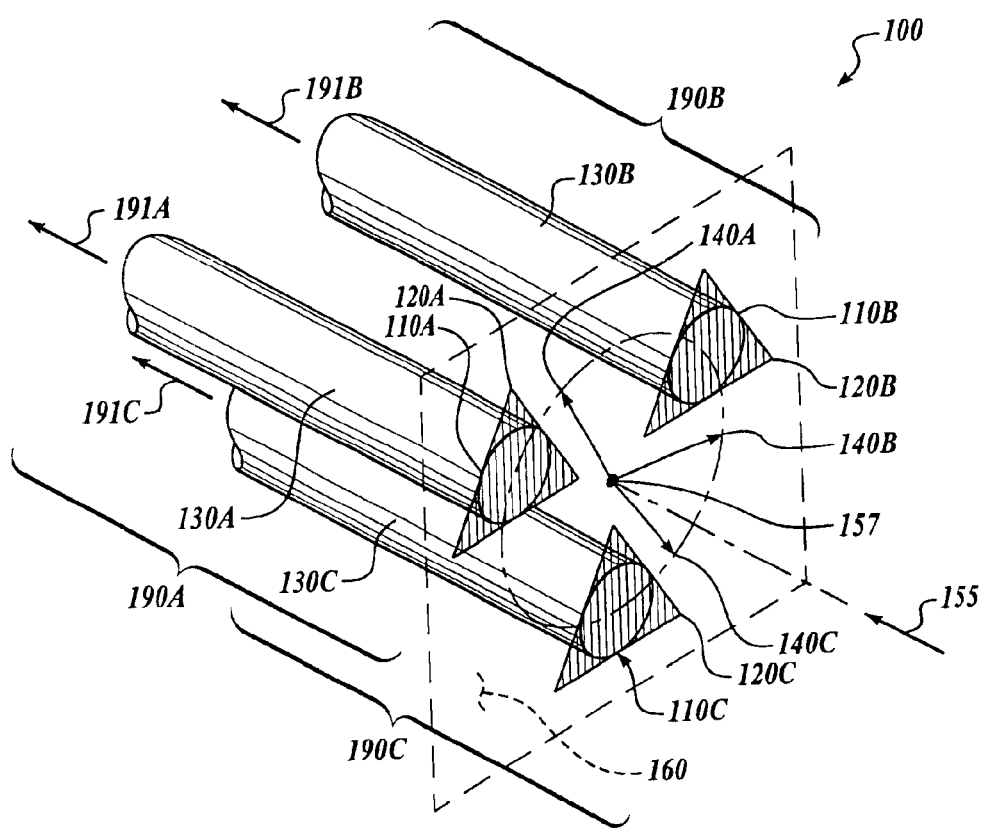
FIG. 1 is an isometric view of a first generic embodiment of a fiber-optic receiver channel arrangement according to this invention.

FIG. 1 shows a first generic embodiment of a fiber-optic receiver channel arrangement 100 according to this invention. As shown in FIG. 1, the fiber-optic receiver channel arrangement 100 includes three fiber-optic receiver channels 190A, 190B and 190C. The fiber-optic receiver channel 190A includes a receiver channel aperture 110A, a phase mask 120A, and a receiver optical fiber 130A. Similarly, The fiber-optic receiver channel 190B includes a receiver channel aperture 110B, a phase mask 120B, and a receiver optical fiber 130. Similarly, The fiber-optic receiver channel 190C includes a receiver channel aperture 110C, a phase mask 120C, and a receiver optical fiber 130C.

For each fiber-optic receiver channel 190, the phase mask 120 includes a grating that completely covers the receiver channel aperture 110, acting as a spatial filter for incoming illumination. The receiver optical fiber 130 is aligned with the receiver channel aperture 110 such that nominally all illumination received by the receiver channel aperture 110 is channeled down the optical fiber 130 to provide an optical signal 191. In various exemplary embodiments the receiver channel aperture 110 is simply a flat end of the receiver optical fiber 130. In various other exemplary embodiments the receiver channel aperture 110 is a shaped end of the receiver optical fiber 130. In various other exemplary embodiments the receiver channel aperture 110 is a compact refractive or diffractive lens, which gathers the incoming illumination through the phase mask 120, concentrates the light, and directs the light to the end of the receiver optical fiber 130, which is aligned to receive the light efficiently. The receiver channel aperture 110, the phase mask 120 and the end of the receiver optical fiber 130 of each fiber-optic receiver channel 190 are fastened in a fixed relationship to each other by adhesives or other suitable methods.

In various exemplary embodiments according to this invention, the phase masks 120 are arranged in a coplanar arrangement which defines and/or coincides with a nominal receiving plane 160. Various exemplary embodiments of the phase masks 120, as well as their specific orientation and individual phase positions are described in detail further below. The location of the receiver channel apertures 110 is conveniently described with reference to a channel arrangement center 157 of the fiber-optic receiver channel arrangement 100. In various high accuracy optical fiber readhead embodiments according to this invention, the channel arrangement center 157 is positioned to coincide with the nominal center of any illumination field presented to the fiber-optic receiver channel arrangement 100, as described further below. The effective center of each respective receiver channel aperture 110A–110C is located at a respective location radius 140A–140C from the channel arrangement center 157, as shown in FIG. 1. The receiver aperture location radius is generically indicated as $R_{AL}$ herein. For purposes of this invention, in various embodiments where a receiver channel aperture 110 does not have an obvious geometric center, the effective center may be taken as the centroid of the aperture area.

Useful receiver aperture location radii 140, and aperture areas, may be determined according to the principles of this invention as discussed in detail with reference to FIGS. 9–12, below. In various exemplary embodiments the receiver channel apertures 110 are identical and their respective location radii 140 are identical. Generally, using identical fiber-optic receiver channels 190 in a fiber optic readhead according to this invention allows simpler construction, simpler signal processing and relatively higher measurement accuracy. However, more generally, the receiver channel apertures 110 and/or their respective location radii 140 need not be identical in various exemplary embodiments according to this invention.

The fiber-optic receiver channels 190 are generally arranged in a fixed relationship to each other. In particular, the gratings of the phase masks 120 of each fiber-optic receiver channel 190 are nominally coplanar and are fixed in a particular spatial phase relationship with respect to one another in the receiving plane 160. In various exemplary embodiments the phase masks 120 are fixed in a particular spatial phase relationship by fabricating them on a single mask substrate, as described further below. Exemplary assembly pieces and methods are discussed in detail further below.

Figure 2:
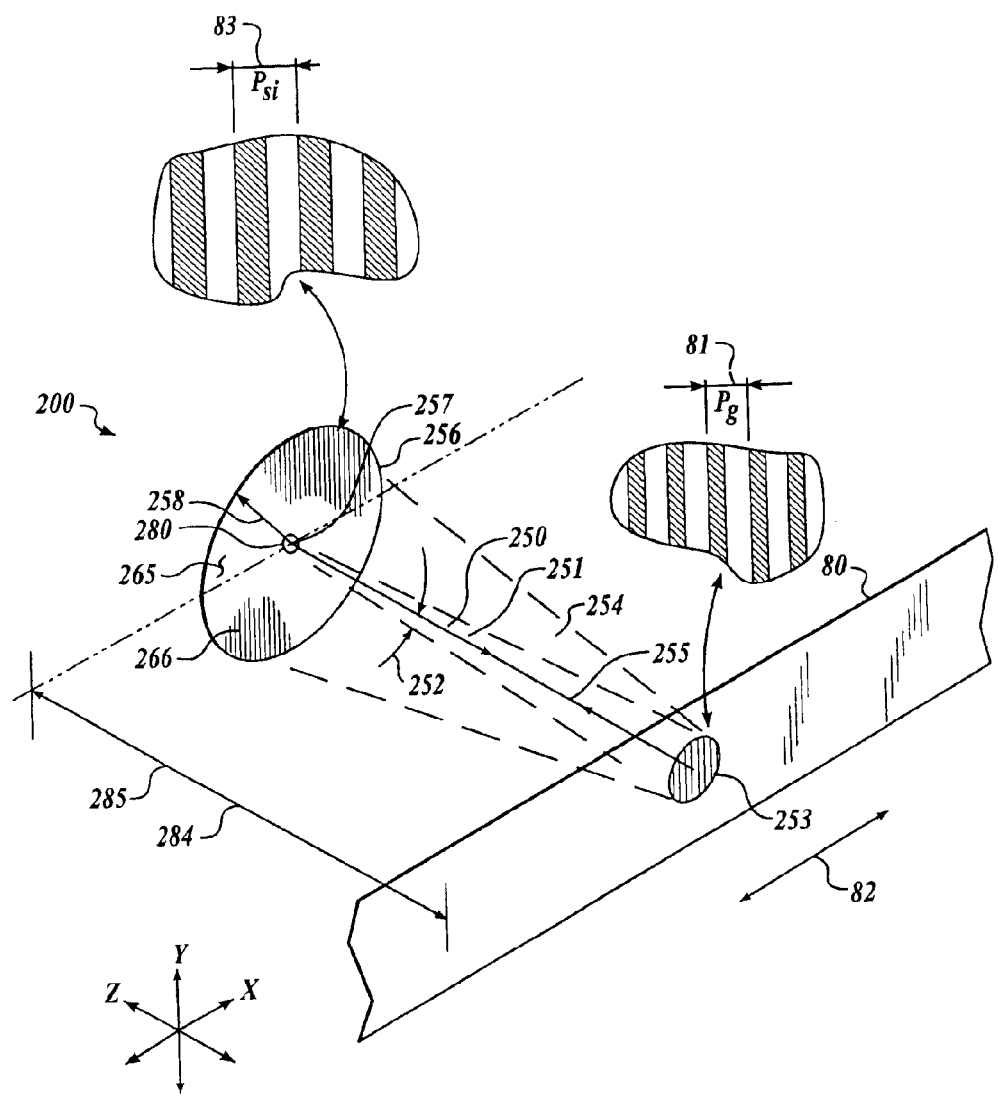
FIG. 2 is an isometric view of a first generic embodiment of a self-imaging arrangement usable in various exemplary fiber optic readheads according to this invention.

FIG. 2 shows a first generic embodiment of a self-imaging arrangement 200 usable in various exemplary fiber optic readheads according to this invention. The basic principle of self-images, also known as Talbot images, is well known and is not described in detail here. One classic analysis is presented in the paper by Cowley, J. M., and Moodie, A. F., 1957, *Proc. Phys. Soc. B*, 70, 486, which is incorporated herein by reference. The self-imaging arrangement 200 includes a light source 280 and a scale grating 80, separated by a source gap 284. The dimension of the source gap is generally indicated as either $z_s$ or, if the source gap 284 and an image gap 285 are the same, as z herein. The scale grating 80 is aligned along a measuring axis 82 and includes grating elements or bars extending perpendicular to the measuring axis 82, as indicated by vertical lines in an illumination spot 253. The grating elements or bars are arranged periodically along the measuring axis 82 according to a grating period 81, generally indicated herein as the grating period or grating pitch $P_g$.

The X, Y and Z axes shown in FIG. 2 may be defined with reference to the plane of the scale grating 80. The X axis is parallel to the plane of the scale grating 80 and to the measuring axis 82. The X-Y plane is parallel to the plane of the scale grating 80 and the Z axis is perpendicular to that plane.

In the generic self-imaging arrangement 200 the light source 280 emits a source light 250 generally along a source light axis 251. The source light is generally monochromatic or quasi-monochromatic and has a nominal wavelength λ. The source light 250 generally diverges at a divergence half-angle 252. The source light 250 travels over a distance equal to a source gap 284 and illuminates the scale grating 80 at an illumination spot 253 and is reflected as scale light 254 generally along a scale light axis 255. In the embodiment shown in FIG. 2, the source light axis 251 and the scale light axis 255 are parallel to the Z axis and mutually coincide. The scale light 254 travels over a distance equal to the image gap 285 to a self-image plane 265. The dimension of the image gap is generally indicated as z herein. In a self image plane 265, the scale light 254 provides an illumination field 256 including a self-image 266. The illumination field 256 has an illumination field center 257 and a nominal illumination field radius 258. The self-image 266 is an image consisting of light and dark stripes, each extending perpendicular to the measuring axis 82. The light and dark stripes are periodic in the direction parallel to the measuring axis 82 according to a self-image period 83, generally indicated herein as the self-image period or self-image pitch $P_{si}$.

In the self-imaging arrangement 200, the self-image plane 226 is parallel to the plane of the scale grating 80. It should be appreciated that self-images are localized in space at a particular set of self-image planes. When the light source 280 is effectively a point source, and the arrangement is approximately as shown in FIG. 2, the self-image conditions for usable the self-image planes, including both "in phase" images and "reverse images" are:

$$\frac{z_s z}{z_s + z} = 2\nu \frac{P_g^2}{\lambda} \tag{Eq. 1}$$

and for the magnification of the image pitch $P_{si}$ relative to the grating pitch $P_g$:

$$P_{si} = \frac{z_s + z}{z_s} P_g \tag{Eq. 2}$$

where:

$\nu = 0, 1, 2, \ldots$ $z_s$ is the source gap;

z is the image gap; and

λ is the wavelength of the source light.

Thus, for the configuration shown in FIG. 2, with $z=z_s$ usable self-image planes are located at integer multiples of $2P_g^2/\lambda$ and the pitch $P_{si}$ will be twice the grating pitch $P_g$.

It should be appreciated that there are also images generally known as Fresnel images located at planes between the self-image planes. So long as the pitch of the phase masks 120 are adjusted to match the pitch of a chosen Fresnel image, Fresnel images may be used as self-images according to the principles of this invention and are encompassed within the term self-image as used herein. The characteristics of Fresnel images can be understood and applied with reference the article by Krzysztof Patorski, The Self-Imaging Phenomenon and Its Applications, *Progress in Optics*, ed. E. Wolf, 27, 3–108, North Holland, Amsterdam 1989.

In various other embodiments according to this invention, the scale grating 80 is a reflective phase grating type scale specifically constructed such that the $0^{th}$ order reflection from the scale is suppressed. While the self-images of a phase grating are not usable for an encoder, other usable images are available that give stronger signal than available with an amplitude grating such as that in the analysis above. It should be appreciated that for such embodiments, the location of the usable images deviates from the location of the self-images in the analysis above. The distance between the best usable image planes will remain the same as analyzed above, except there will be a certain additional offset in the gap between the scale and the first usable image plane of half the distance between usable image planes. For instance, a phase grating of 20 micron period with source wavelength 780 nm in a reflective configuration with $z=z_s$ will have usable image planes (with successively opposing phases) at nominal gaps of $z=0.513+\nu*1.026$ mm, $\nu=1,2,3\ldots$, neglecting possible offsets from mask and scale substrate thicknesses. The offset required to adjust the gap for best operation may easily determined experimentally by observing the fiber optic receiver channel signals at various operating gaps. Alternatively, appropriate analysis or simulation may be used to determine the additional offset.

In various exemplary embodiments according to this invention, a particularly simple and effective embodiment of the light source 280 is the end of a single optical fiber that transmits coherent light provided by a remote laser diode or other suitable light source. In various other exemplary embodiments, the light source 280 is two or more such sources arranged at a precise spacing as described in detail below with reference to FIG. 17. In yet other various other exemplary embodiments, the light source 280 is a periodic array of source grating apertures arranged at the end of one or more optical fibers that transmits light from a remote LD or LED or other suitable light source. The source grating apertures have a prescribed width and a prescribed period, as described in more detail below with reference to FIG. 18. In yet other exemplary embodiments, the light source 280 is provided by a miniature solid state laser element or a source grating and a miniature LED element contained in the fiber optic readhead. In such cases it should be appreciated that the readhead construction may become more complex and costly, and some of the benefits of an all-optical readhead are lost. However, even in such cases, at least some of the benefits of a readhead incorporating an all-optical receiver channel arrangement according to this invention will remain.

Figure 3:
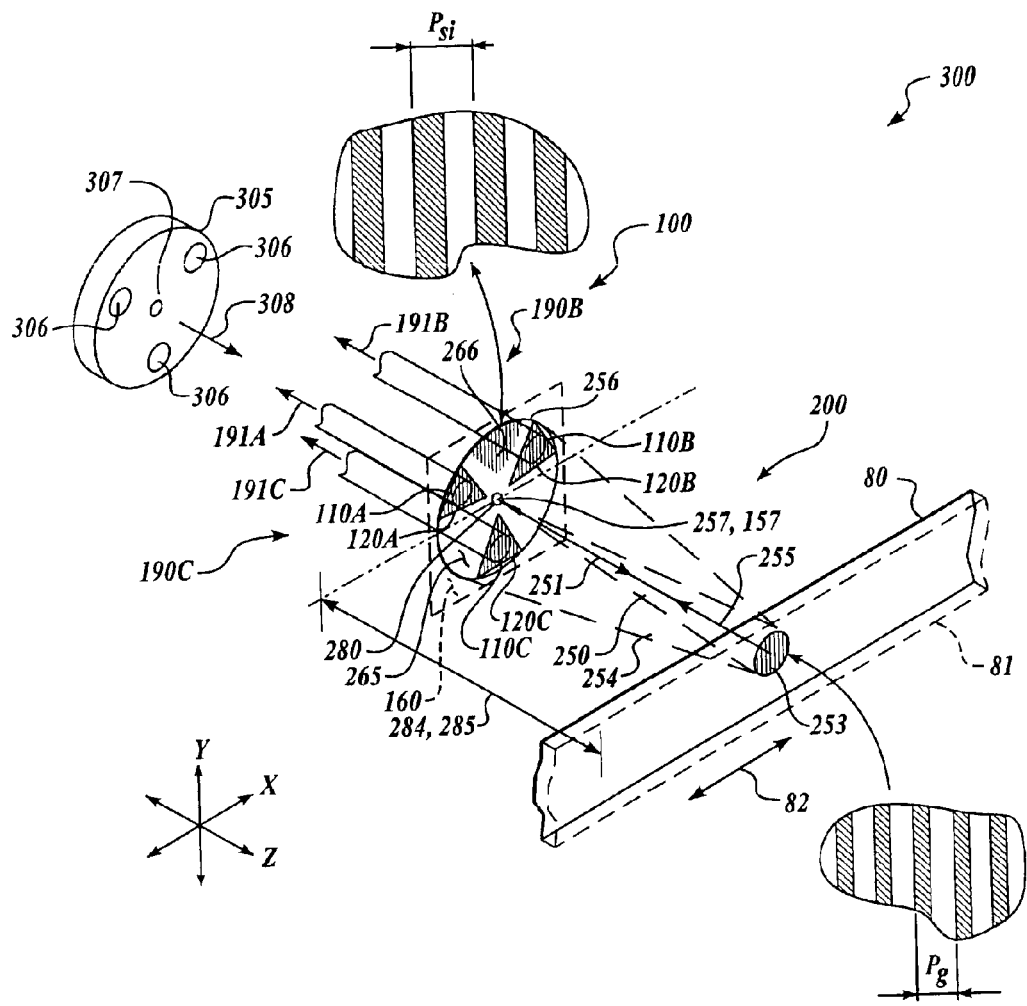
FIG. 3 is an isometric view of a first generic embodiment of a fiber-optic readhead arrangement according to this invention.

FIG. 3 shows a first generic embodiment of a fiber-optic readhead arrangement 300 according to this invention. The fiber-optic readhead arrangement 300 includes the first generic embodiment of a fiber-optic receiver channel arrangement 100 and the first generic embodiment of a self-imaging arrangement 200, as previously described with respect to FIG. 1 and FIG. 2, respectively. As shown in FIG. 3, the light source 280 emits the source light 250, generally along a source light axis 251. The source light 250 travels over a distance z equal to a source gap 284, illuminates the scale grating 80, which is carried on a scale 81 shown in dashed outline, at an illumination spot 253. The illumination spot 253 reflects light as scale light 254 generally along the scale light axis 255. In the embodiment shown in FIG. 3, the source light axis 251 and the scale light axis 255 are parallel to the Z axis and mutually coincide. The scale light 254 travels over a distance z equal to the image gap 285 to a self-image plane 265. In the self-image plane 265, the scale light 254 provides an illumination field 256 including the self-image 266 consisting of light and dark stripes at the self-image pitch $P_{si}$, as previously described.

The receiver plane 160, previously described with reference to FIG. 1, is arranged to nominally coincide with the self-image plane 265. It should be appreciated that the self-image actually exists in "less focused" planes adjacent to the previously described "perfect" self-image planes. In some exemplary embodiments, the receiver is intentionally arranged to nominally coincide with such "less focused" self-image planes, and an adequate or desired image is still detected according to the principles of this invention. For example, such "less focused" self-image planes may be intentionally chosen to suppress unwanted higher-order spatial harmonic content in the self-image 266. The channel arrangement center 157 is also nominally aligned with the illumination field center 257. It should be appreciated that in this embodiment of the fiber-optic readhead arrangement 300, the source 280 is also nominally aligned with the illumination field center 257. The alignment of all components is readily achieved in various exemplary embodiments by the use of an alignment plate generally located proximate to and aligned with the phase masks and having the required number of receiver fiber holes and, source fiber holes, if applicable. The various fiber ends are inserted and fixed in the appropriate holes to provide the required alignments. FIG. 3 shows an "exploded view" of one exemplary alignment plate 305. The arrow 308 indicates that the alignment plate 305 is to be positioned proximate to the phase masks 120, not in the "exploded" position illustrated. The alignment plate 305 has receiver fiber holes 306 and a source fiber hole 307, if applicable in various embodiments. In the nominally aligned receiver plane 160 and self-image plane 265, for each respective fiber-optic receiver channel 190, the respective phase mask 120 spatially filters the incoming self-image illumination. In the exemplary embodiment shown in FIG. 3, the respective phase masks 120A, 120B and 120C each have a mask pitch $P_m$ that is the same as the image pitch $P_{si}$, and they are arranged at respective spatial phase positions of 0 degrees, 120 degrees and 240 degrees in terms of the self-image 266. Thus, the fiber-optical fiber receiver channels 190A, 190B and 190C receive illumination similarly spatially filtered except for a spatial phase difference. It will be appreciated that as the scale grating 80 moves by an increment $P_g$ along the measuring axis, the self-image moves by an increment $P_{si}$ relative to the phase masks 120. Thus, the optical signals 191A, 191B and 191C corresponding to the optical receiver channels 190A, 190B and 190C show approximately identical sinusoidal intensity variations as the scale grating 80 moves along the measuring axis, but with relative phase shifts of 120 degrees. Well known methods are available for determining the displacement of the scale grating 80 relative to the phase masks 120A, 120B and 120C based on such "three-phase" displacement signals.

Thus, the exemplary fiber-optic readhead arrangement 300 shown in FIG. 3 provides a displacement measuring system usable in a variety of fiber optic readheads according to this invention. It will also be appreciated by one of ordinary skill in the art that the reflective fiber-optic readhead arrangement 300 shown in FIG. 3 has a transmissive fiber-optic readhead arrangement counterpart. In such a case, the light source 280 is located along the Z axis at the same distance on the opposite side of a transmissive scale grating, at a similar source gap 284' between the light source 280 and the scale grating.

The exemplary fiber-optic readhead arrangement 300 provides a three-phase measurement system. However, it will be appreciated that alternative embodiments of the phase masks 120, along with corresponding alternative arrangements of the optical receiver channels 190 are usable in the generic fiber optic readhead arrangement 300. Various exemplary embodiments of the phase masks 120, including embodiments that provide optical signals having a quadrature phase relationship, or higher order phase relationships, are described in detail further below.

Figure 4:
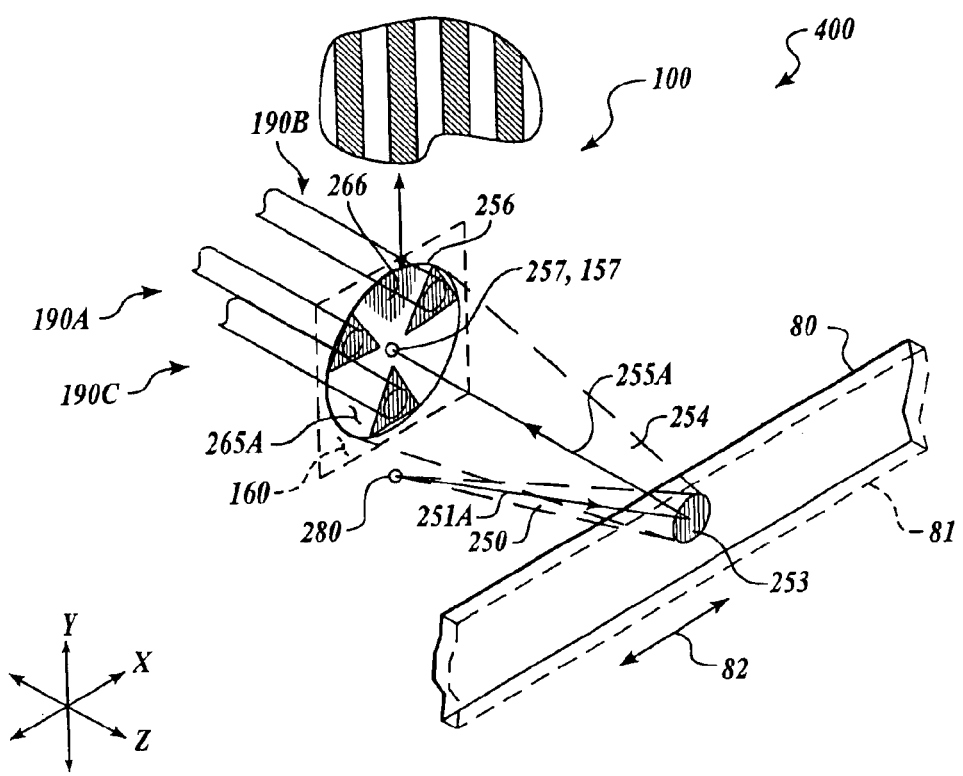
FIG. 4 is an isometric view of a second generic embodiment of a fiber-optic readhead arrangement according to this invention.

FIG. 4 shows a second generic embodiment of a fiber-optic readhead arrangement 400 according to this invention that operates in the same manner as the fiber-optic readhead arrangement 300, except as noted in the following description. The elements which lack reference numerals in FIG. 4 will be understood to be the same as the apparently similar elements in FIG. 3. The fiber-optic readhead arrangement 400 includes the first generic embodiment of a fiber-optic receiver channel arrangement 100 as previously described with respect to FIG. 1 and a second generic embodiment of a self-imaging arrangement.

As shown in FIG. 4, the light source 280 emits the source light 250, generally along a source light axis 251A that lies at an angle from the Z axis in the Y-Z plane, as shown. This angle is designated −β in this discussion. The source light 250 travels over a distance $z_s$ to illuminate the scale grating 80 at the illumination spot 253. The illumination spot 253 reflects light as scale light 254 generally along the scale light axis 255A, which lies at an angle +β from the Z axis in the Y-Z plane, as shown. It will appreciated that for light ray components in the direction parallel to the Y-Z plane the grating scale acts like a plane mirror. The scale light 254 travels over a distance z to a self-image plane 265A, which is a plane normal to the scale light axis 255A such the conditions of EQUATION 1 and EQUATION 2 are fulfilled. Thus, in the self-image plane 265A, the scale light 254 provides an illumination field 256 including the self-image 266, consisting of light and dark stripes at self-image pitch $P_{si}$, as previously described.

The receiver plane 160, is arranged to nominally coincide with the self-image plane 265A and the channel arrangement center 157 is nominally aligned with the illumination field center 257, similarly to the fiber-optic readhead arrangement 300. Thus, as in the fiber-optic readhead arrangement 300, the fiber-optical fiber receiver channels 190A, 190B and 190C receive illumination that is similarly spatially filtered except for a spatial phase difference and produce the corresponding optical signals 191A, 191B and 191C as in the fiber-optic readhead arrangement 300.

Thus the fiber-optic readhead arrangement 400 shown in FIG. 4 provides an alternative "angled" arrangement where the source 280 is separated from the channel arrangement center 157 and the illumination field center 257. It will also be appreciated by one of ordinary skill in the art that the reflective fiber-optic readhead arrangement 400 shown in FIG. 4 has a transmissive fiber-optic readhead arrangement counterpart. In such a case, the light source 280 is located in a symmetric position across the X-Y plane of the scale grating 80, along an extension of the scale light axis 255. It will be appreciated that in such a case, the scale grating 80 is a transmissive scale grating.

Such alternative arrangements are usable in a variety of fiber optic readheads according to this invention. It will be appreciated that alternative embodiments of the phase masks 120, along with corresponding alternative arrangements of the optical receiver channels 190, are usable in the second generic fiber optic readhead arrangement 400. Various exemplary embodiments of the phase masks 120, including embodiments that provide optical signals having a quadrature phase relationship, or higher order phase relationships, are described in detail further below.

Figure 5:
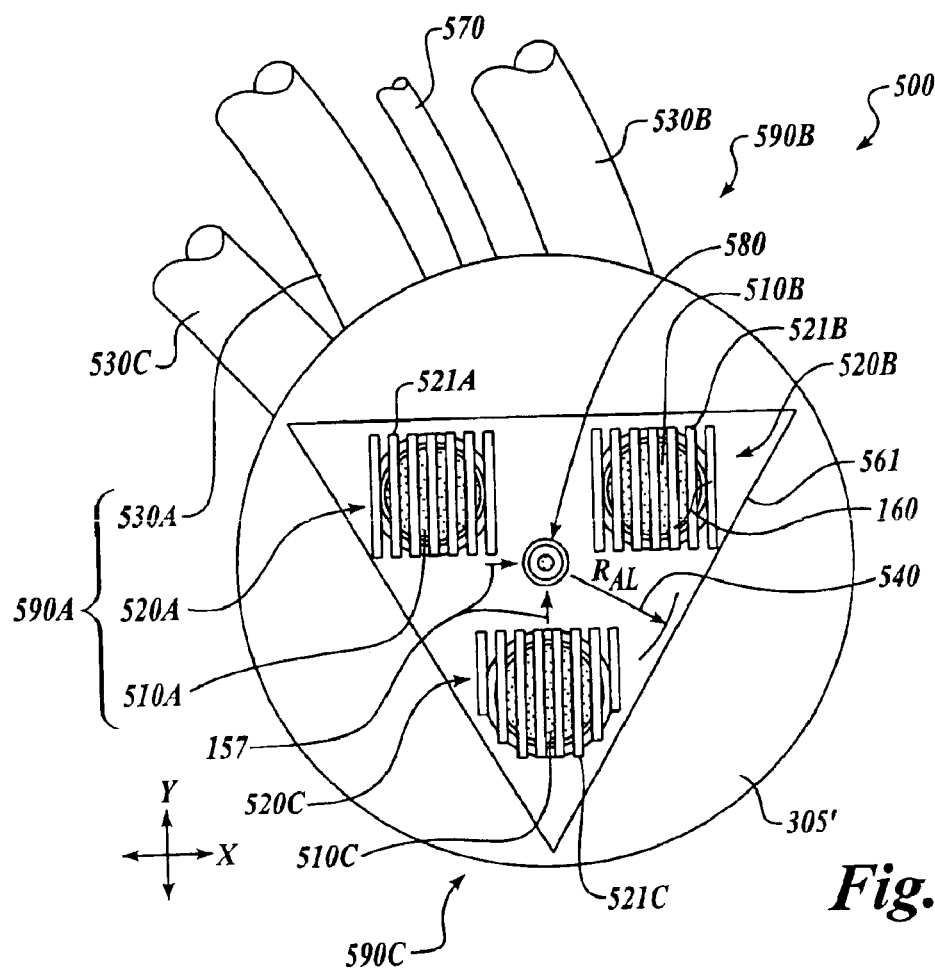
FIG. 5 is a partly orthographic, partly isometric view of a third embodiment of a fiber-optic readhead arrangement according to this invention.

FIG. 5 shows a third embodiment of a fiber-optic readhead arrangement 500 according to this invention, which is configured similarly to, and operates similarly to, the generic fiber-optic readhead arrangement 300 described above with reference to FIG. 3. Due to these similarities in configuration and operation, only certain aspects of the fiber-optic readhead arrangement 500 that require additional explanation, are described below.

As shown in FIG. 5, the fiber-optic readhead arrangement 500 includes three fiber-optic receiver channels 590A–590C, which operate similarly to the previously described fiber-optic receiver channels 190A–190C. For example, the fiber-optic receiver channel 590A includes a receiver channel aperture 510A, a phase mask 520A, and a receiver optical fiber 530A. Also included is a phase mask element 561 of a transparent material, an alignment plate 305' that is essentially similar to the generic alignment plate 305 previously described, and a light source 580 provided by the end of a source fiber 570. The source fiber 570 carries laser light input at a remote end of the fiber that is proximate to a remote laser source, for example as described with reference FIG. 8, below. The laser light is emitted as source light from the readhead-end of the source fiber 570 to provide a light source 580 suitable for self-imaging according to this invention. In various exemplary embodiments, the readhead end of the source fiber 570 is flat and perpendicular to the fiber axis, and is butted against the phase mask element 561. An exemplary source fiber 570 is described in detail below.

The phase mask element 561 may be constructed according to any now known or later developed thin film techniques, materials and processes, such as those currently used to fabricate a number of commercially available encoder readheads, or the like. For the exemplary embodiment shown in FIG. 5, the phase mask element 561 is a triangularly shaped element carrying the phase masks 520A–520C as shown. The phase mask element 561 is transparent and free of opaque mask elements in the vicinity of the light source 580. Thus, the source light is transmitted through the phase mask element 561. According to the previously described principles of this invention, the phase masks 520A–520C are arranged in a coplanar arrangement on a surface of the phase mask element 561, and that surface defines the receiving plane 160 which is nominally aligned with the self-image plane 265 (not shown). The inventor has found that in some readhead embodiments according to this invention, better performance results when such phase mask elements are on the surface that is positioned nearest the ends of the receiver optical fibers, such as the ends of the receiver optical fibers 530A–530C in this exemplary embodiment.

In one exemplary embodiment, each of the exemplary phase masks 520A–520C is fabricated with a 16 micron pitch, to match a self-image pitch $P_{si}$ provided by an exemplary scale grating 80 (not shown), having a scale grating pitch of 8 microns. In one exemplary embodiment the scale grating 80 is illuminated with 635 nanometer laser light for the light source 580 at a nominal self-imaging gap of z=1.61 mm, which is experimentally adjusted to compensate for the gap change due the refractive index of the substrate material of the phase mask element 561, when the phase masks 520 are positioned away from the scale. In such a case, for a typical divergence half angle from a fiber optic light source 280 of approximately 7 degrees to include on the order of 90% of the optical energy of the beam, the illumination field that includes on the order of 90% of the optical energy of the beam is on the order of 0.8 mm in diameter.

The phase masks 520A–520C are arranged to provide a three-phase measuring system. Thus, taking the edge of a grating bar 521A in the phase mask 520A as a reference, the corresponding edges of the grating bars in the phase mask 520B will be spatially phase shifted in a first direction along the X axis by +120 degrees of spatial phase shift, or ⅓*16 microns, modulo 16 microns. The corresponding edges of the grating bars in the phase mask 520C will be spatially phase shifted in the opposite direction along the X axis by the same amount, ⅓*16 microns, modulo 16 microns. In one exemplary embodiment, the spatial duty cycle of the phase masks 520 is 50/50. In various other exemplary embodiments, the duty cycle (and even the nominal pitch) of the phase masks 520 may be adjusted according to any known or later developed method, to suppress certain spatial harmonics in the received self-image, and/or to correct for self-image aberrations or the like.

The grating bars 521 of the phase masks 520 should completely cover each respective receiver channel aperture 510. In the exemplary embodiment shown in FIG. 5, this includes making most of the grating bars 521 of a length equal to the outer diameter of the underlying receiver optical fiber 530, plus an additional length sufficient to encompass any assembly tolerance variations. Likewise, sufficient periods of the mask grating should be present to cover the receiver area in the direction orthogonal to the grating bar length, plus any additional amount required due to tolerance considerations. However, it should be appreciated that the effective receiver aperture 510 of a receiver optical fiber 530 is typically less than its outer diameter, so this a conservative guideline and not a limiting design criterion. An exemplary receiver optical fiber 530 is described in detail below.

It should be appreciated that for reduced errors and more consistent performance from receiver to receiver in a various exemplary fiber optic readheads according to this invention, the signal amplitudes between the various fiber-optic receiver channels are nominally balanced, and phase errors resulting from edge effects at the boundary of the phase mask are minimized. It should also be appreciated that when the pitch of the phase masks is coarse relative to the size of the optical fiber receiver apertures, the effective open aperture area of each channel between the bars of the phase masks can depend significantly on the phase mask offset relative to the aperture center or outline. Since the phase mask offset may be for different fiber-optic receiver channels, this may unbalance the amplitudes of the various phase signals and potentially cause related phase measurement errors. Thus, in various exemplary embodiments according to the this invention, a respective optical fiber receiver aperture diameter is at least 3 times the grating pitch of its respective phase mask. In various other embodiments it is at least 5 times the grating pitch of its respective phase mask, and yet other embodiments it is at least 8 times the grating pitch of its respective phase mask, such that offset-related edge quantization effects, formed in the fiber receiver aperture by the phase mask grating bars, are sufficiently controlled. It should be appreciated the previous fiber optic encoders designed for only for relatively crude accuracy and resolution have not adequately considered this factor.

In one exemplary embodiment of the fiber-optic readhead arrangement 500, the source fiber 570 has an outer diameter of 50 microns, and is concentric with the channel arrangement center 157, as previously described with reference to FIGS. 1 and 3. The outer diameter of each of the receiver optical fibers 530 is 250 microns, and they are all located from the channel arrangement center 157 at the same receiver aperture location radius 540, generically indicated as $R_{AL}$, of 250 microns. All fibers are butted against the phase mask element 561 along with the alignment plate 305', and the resulting assembly is joined together by an appropriate optical grade adhesive, or the like. Care is to be taken that all apertures are free of materials that attenuate light significantly. In various exemplary embodiments, all components are placed with positional tolerances on the order of 10–50 microns. The inventor has determined that for the exemplary design values previously described, the fiber-optic readhead arrangement 500 provides resolution well below one-tenth micron, and sub-micron accuracy when a reasonable and practical level of care is taken in assembly, alignment and signal processing of the optical signals provided by the arrangement.

Thus, the fiber-optic readhead arrangement 500 provides a 3-phase optical readhead usable in a variety of fiber optic readheads according to this invention. It should be appreciated that all critical components of the fiber-optic readhead arrangement 500 are encompassed within an overall diameter of approximately 750 microns. Therefore, when non-essential peripheral portions of the alignment plate 305' and the phase mask element 560 are removed, the fiber-optic readhead arrangement 500 provides a high resolution, high accuracy optical fiber readhead arrangement that provides self-imaging based measurement signals in a sub-millimeter total readhead diameter.

Figure 6:
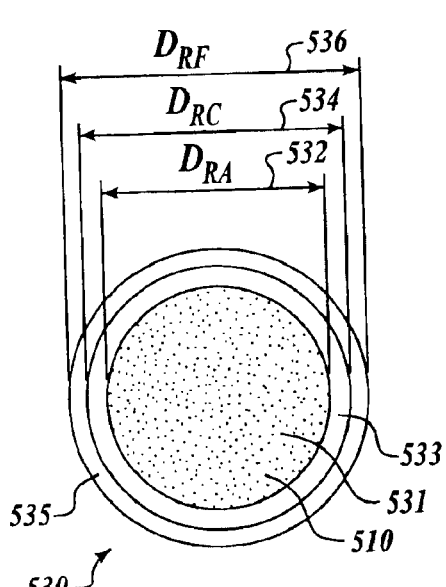
FIG. 6 shows an exemplary a receiver channel optical fiber usable according to this invention.

FIG. 6 shows one exemplary receiver channel optical fiber usable as the receiver optical fiber 530, and in various other embodiments according to this invention. As FIG. 6 shows, the receiver optical fiber 530 has a central core area 531 of diameter $D_{RA}$ 532 that, together with surrounding cladding layer 533 of diameter $D_{RC}$ 534, acts as a waveguide or multiple waveguides for light that impinges upon it. The core area 531 thus provides the receiver channel aperture 510. An additional "buffer" layer 535 (which may actually be comprised of a number of thinner layers that are not relevant to this discussion) provides an outer receiver diameter of $D_{RF}$ 536. The buffer layer 535 is optional in various exemplary embodiments. In various other exemplary embodiments, the buffer layer 535 surrounds the cladding layer 533 for purposes of protection and/or is custom sized for providing the best outer receiver diameter $D_{RF}$ for purpose of convenient and economical geometric packing, spacing and assembly according to certain principles of this invention.

In one exemplary embodiment, the receiver optical fiber 530 is a commercially available multimode fiber that is a silica fiber with 200/220/250 micron core/cladding/buffer diameters $D_{RA}/D_{RC}/D_{RF}$. Even thinner cladding is commercially available, down to a layer only 5 microns thick or less, depending on the core diameter 532. It will be appreciated that receiver optical fibers with large receiver aperture diameters providing a maximum ratio of core diameter 532 to outside diameter 536 may provide the strongest signals and highest accuracy in various exemplary embodiments, as described in detail further below. A thin layer of cladding 533 helps provide optical isolation of the receiver 530. In various other embodiments according to this inventions, plastic receiver optical fibers are used.

In other exemplary embodiments, commercially available multiple core fibers are used. Such fibers have advantages in allowing tighter bending radii in the receiver fibers within the cable of an optical fiber readhead. These fibers have multiple cores interspersed with cladding material within the clear aperture area 510. Also available are multiple core fibers where each individual core can be large enough to be used as a fiber-optic receiver channel according to this invention, and the inherent multiple core fiber spacing forms the receiver geometry in various optical fiber encoder readheads according to this invention. In other exemplary embodiments, such fibers are not used because of larger size, higher cost, and/or restricted cable bending radius, in comparison to the individual receiver fibers previously discussed. It should appreciated that economical single mode optical fibers generally have a small core diameter, which allows a small size but also limits the available signal strength in various exemplary embodiments according to this invention. Thus, in various other exemplary embodiments according to this invention the ends of a number of multimode fibers are used together to form each of the receiver apertures, such as the previously described receiver apertures 110 and/or 510, or the like.

Figure 7:
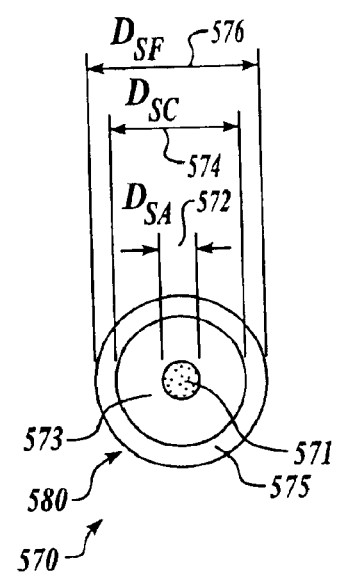
FIG. 7 shows an exemplary a light source optical fiber usable according to this invention.

FIG. 7 shows an exemplary a light source optical fiber usable as the light source optical fiber 570 to provide the light source 580 shown in FIG. 5, and in various other embodiments according to this invention. As shown in FIG. 7, the light source fiber 570 has a central core 571 of diameter $D_{SA}$ 572 surrounded by a cladding layer 573 of diameter $D_{SC}$ 574, which is surrounded by buffer layer 575 giving an outer fiber diameter of $D_{SF}$ 576. In various exemplary embodiments all or part of the buffer layer is omitted or removed to allow flexible optical fiber sizing for purposes of constructing the readhead with desired fiber spacing, and to achieve a desired overall readhead diameter. Such flexible optical fiber sizing is used to provide for economical geometric packing, spacing and assembly according to certain principles of this invention, in various exemplary embodiments. In various other exemplary embodiments, the buffer layer 575 may be present, and flexibly increased in size, for similar purposes of economical geometric packing, spacing and assembly convenience. In various other exemplary embodiments, the cladding and/or buffer layer is specified at a desired size and is fabricated with sufficient precision to provide the nominally desired geometric packing, spacing and assembly convenience.

It should be appreciated that the inventor has determined that to provide the most stable signals and highest accuracy in various exemplary embodiments using a laser diode source, the source fiber should operate as a true single mode optical fiber at the operating wavelength of the light source, in order to maintain a constant distribution and amount of light in the illumination field of a fiber-optic readhead according to this invention. The illumination field from such source fibers is relatively immune to bending of the cable of a fiber optic encoder according to this invention. This is a significant factor in most practical applications of position encoders. It should be appreciated the previous fiber optic encoders designed for only for relatively crude accuracy and resolution have not adequately considered this factor.

In various exemplary embodiments, for an operating wavelength of 635 nm, the core diameter of a suitable single mode optical fiber is on the order of $D_{SA}$=4 microns. In such embodiments, the light source optical fiber is a single mode optical fiber that effectively acts as a point source. In various exemplary embodiments the single mode optical fiber furthermore has an outer diameter at the emitting end of less than 50 microns, for example, to facilitate a small readhead diameter. In various exemplary embodiments the single mode optical fiber has an outer diameter at the emitting end of greater than 50 microns, for example, to facilitate a desired readhead assembly spacing. In one particular exemplary embodiment the single mode fiber used as a point source for an operating wavelength of 635 nm is the part number FS-SN-3224 made by 3M Corporation. This single mode fiber has an outer diameter of $D_{SF}$=250 microns, thus providing a fiber which can be conveniently used in economical close packing assembly arrangements such as those described further below, to match the diameter of the commercially available 200/220/250 multimode fiber that is be used for the receiver optical fibers in such embodiments. In various other embodiments, the part number FS-SC-3314, made by 3M Corporation, is used. Optical fibers of this type are commercially available with $D_{SC}$=80 microns and $D_{SF}$=200 microns, providing two additional possible outer fiber diameters for an optical source fiber according to this invention. It will be appreciated that both single mode and multimode fibers can be custom made to any of a wide variety of outer diameters suitable in various exemplary embodiments according to this invention.

It should be appreciated that another advantage of single mode source fibers in various fiber optic readheads according to this invention is their small numerical aperture and the associated range of relatively small illumination divergence angles that they inherently provide, without the need for special light source fiber end processing or lenses. As discussed below with reference to FIG. 9, large divergence angles may lead to undesirable divergence loss at a receiver illumination plane according to this invention. Accordingly, in various exemplary embodiments, a light source according to this invention provides a numerical aperture of less than 0.25. In various other exemplary embodiments, a light source according to this invention provides a divergence half angle of less than 10 degrees. In various other exemplary embodiments, a light source according to this invention provides a divergence half angle of less than 6 degrees.

Figure 8:
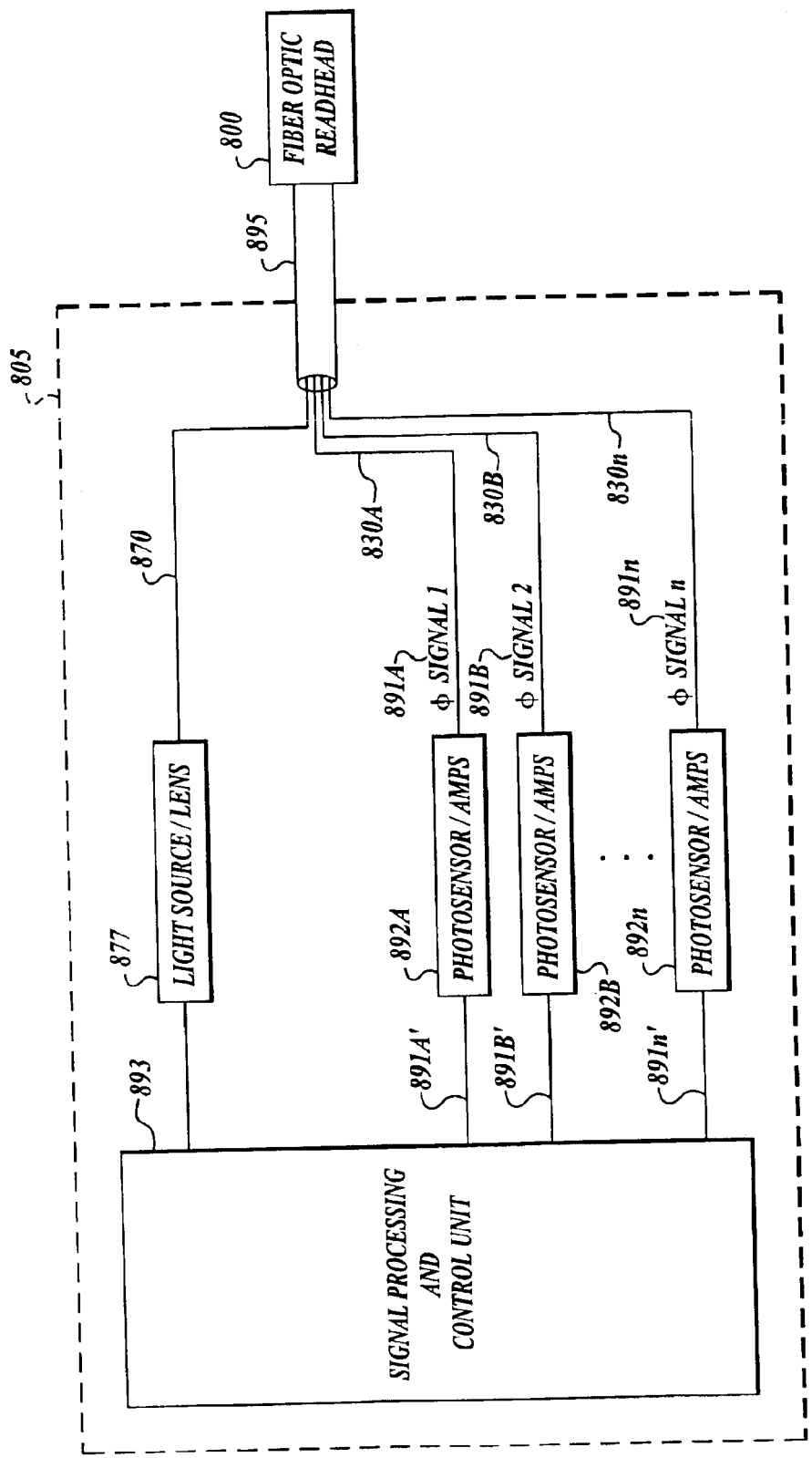
FIG. 8 shows a block diagram including a remote electronic interface unit usable in conjunction with a fiber-optic readhead according to this invention.

FIG. 8 shows a block diagram including a generic remote electronic interface unit 805 that is usable in conjunction with a fiber-optic readhead according to this invention, generically represented by a fiber-optic readhead 800. The remote electronic interface unit 805 includes a signal processing and control unit 893, a light source 877 that may include an optional lens, and an embodiment-specific plurality of photosensor/amps 892A to 892n. The light source/lens 877 may include other optics such as optical isolators or the like. The light source/lens 877 and the photosensor/amps 892A to 892n are coupled to the fiber optic readhead 800 through light source optical fibers 870 and receiver optical fibers 830A to 830n, respectively. The optical fibers 870 and 830A to 830n are routed within a readhead cable 895 that gathers and protects the optical fibers between the fiber optic readhead 800 and the remote electronic interface unit 805. In various exemplary embodiments according to this invention, the readhead cable may be several meters long or more. The receiver optical fibers 830A to 830n carry the optical signals 891A to 891n, respectively. The optical signals 891A–891n are phase signals provided as describe above and further below.

The light source/lens 877 receives power and may receive gain control signals from the signal processing and control unit 893. As described above, the light source/lens 877 transmits light through the source optical fiber(s) 870 to the scale grating of the fiber optic readhead 800. The fiber optic detector channels, such as the fiber-optic receiver channels 190A–190C described above, or the like, receive light from the scale grating of the fiber optic readhead 800 and provide the signals 891A to 891n, which are input to the photosensor/amps 892A to 892n, respectively. The photosensor/amps 892A to 892n provide amplified electronic output signals 891A' to 891n' to the signal processing and control unit 893. It will be appreciated that in various exemplary embodiments described further below, an optical fiber readhead according to this invention may provide a plurality of optical fiber receiver channels carrying optical signals that are summed. For such embodiments, fibers carrying the optical signals that are summed can interface to the same photosensor/amp 892 in order to provide the desired signal summing, or to different photosensor/amps 892 which have their the signals summed electronically during additional signal processing. Thus the configuration shown in FIG. 8 is illustrative only and not limiting.

The following discussion is relevant to the results described with reference to FIG. 9, further below. It should be appreciated that optical fiber readheads according to the present invention can be ultra-miniature readheads. It should be appreciated that in contrast with the relatively crude optical fiber encoder readheads that do not use self-imaging and/or that are not designed to provide high resolution and high accuracy position measurement signals, both the size and inherent signal to noise ratio of such optical fiber encoder readheads are critical. Design constraints such as a desired or economical fiber size, practical illumination field sizes obtained directly from optical fiber sources at specific self-imaging gaps, and practical assembly positioning constraints are all important design considerations. In particular, it should be appreciated that the small receiving aperture diameter that is provided by many optical fibers usable according to this invention may be much smaller than most or all electronic detectors used in prior art readheads, and that such a small receiving aperture diameter severely constrains the available signal energy and the resulting signal to noise ratio.

For all of these reasons, it is important to observe certain design relationships related to providing an adequate signal to noise ratio in light of these severe design constraints. Such design relationships not only indicate the design conditions related to optimum performance, but also indicate a range where design tradeoffs may be made for the sake of assembly techniques, component cost, or other reasons, while still retaining micron-level or even sub-micron level resolution and accuracy. As discussed in more detail below, certain design factors for optical fiber encoder readheads can be used to provide a desirable signal to noise ratio in various exemplary optical fiber encoder readhead embodiments according to this invention.

In various exemplary embodiments, a light source usable according to this invention is a fiber optic light source without a separate lens or collimator: In various exemplary embodiments, such a fiber optic light source outputs a diverging source light beam from its end, the diverging light beam typically having a divergence half angle in the range of 5 to 10 degrees. It is reasonable to assume a Gaussian intensity distribution in such a source light beam. The properties of Gaussian beam distributions are well described in texts on the applications of optical fibers. This Gaussian intensity profile is an important consideration in a fiber optic readhead arrangement according to this invention, for a number of reasons. It should be appreciated that the illuminance in such a beam, that is, the useful flux per unit of cross sectional area, is concentrated disproportionately along the beam axis. Thus, a receiver aperture positioned away from the beam axis suffers "extra" signal loss (compared to a "uniform beam assumption") due to the Gaussian distribution. In addition, it should be appreciated that, just as in a uniform beam, the average beam illuminance will decrease due to purely geometric factors whenever the radius of a spot size or illumination field of the beam is increased, due to "divergence loss". Also, it should be appreciated that in an "aligned" reflective configuration, such as those shown in FIGS. 2 and 3, with a Gaussian beam the highest illuminance in the illumination field 265 is on and surrounding the illumination field center 257. However, mechanical interference with the light source 280 and various other assembly considerations may prohibit locating the receiver apertures 110 in that region of highest illuminance.

The following equation, EQUATION 3, takes the factors discussed above into account in the variable D. In addition, the equation includes other important factors to provide a useful analysis of the dependence of the signal to noise ratio on various design factors in a fiber optic readhead arrangement according to this invention:

$$S \approx PCg_1g_2DR_dG_d \quad \text{(Eq. 3)}$$

Figure 9:
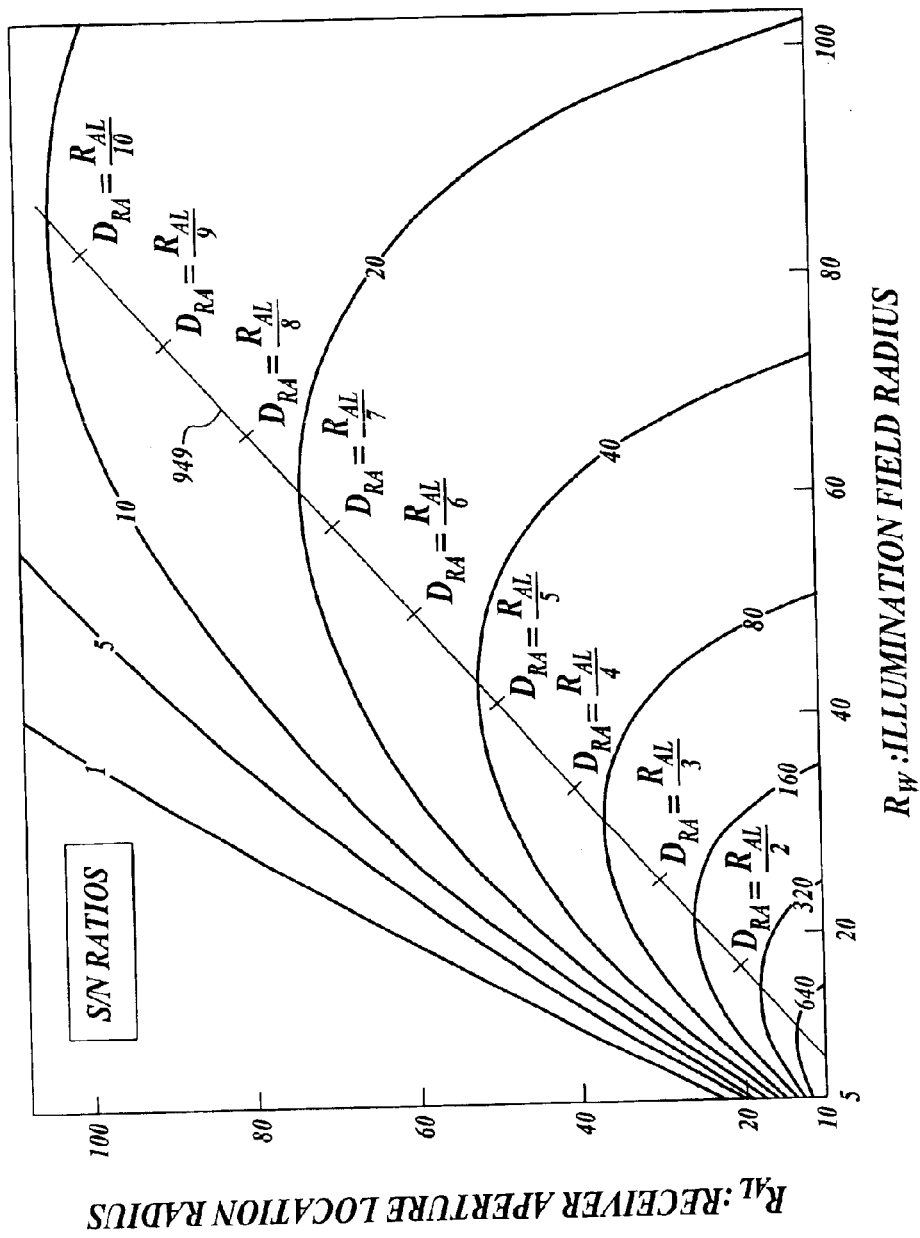
FIG. 9 is a diagram showing representative signal to noise ratios that result for various receiver aperture diameters when the receiver aperture of a fiber optic detector channel is positioned at various radii from the center of an illumination field, for a fiber-optic readhead arrangement approximately corresponding to FIG. 3.

The following table defines the symbols used in EQUATION 3, and also includes typical values used to determine the results shown on FIG. 9, where applicable.

TABLE 1

| Symbol | Description | Value |
|---|---|---|
| S | Signal Power | Dependent, result. |
| P | Laser Power (see FIG. 8) | 20 mW |
| C | Fiber Coupling interface loss | 0.9 |
| $g_1$ | Scale Efficiency (reflection loss) | 0.5 |
| $g_2$ | Phase Mask loss (filtering) | 0.8 |
| D | Divergence loss: Geometric effects including Gaussian beam effects. | Dependent: as described above. |
| $R_d \times G_d$ | Photodetector and Preamp: Responsivity × Gain (see FIG. 8) | 16 V/mW |

A value of 0.05 mV is assumed for the typical electronic system noise in a suitable fiber optic readhead signal processing remote electronics, such as that described with reference to shown in FIG. 8. This is the noise value used for the S/N results shown in FIG. 9.

FIG. 9 is a diagram showing representative signal to noise ratios that result for various receiver aperture diameters $D_{RA}$ when the receiver aperture of a fiber optic detector channel is positioned at various receiver aperture location radii $R_{AL}$ from the center of an illumination field, approximately corresponding to the generic fiber-optic readhead arrangement 300 described above with reference to FIG. 3. The illumination field radius $R_W$, shown on the horizontal axis in FIG. 9, is comparable to the illumination field radius 258, shown in FIG. 2. For a Gaussian beam profile, the edge of the beam or the resulting illumination field is not well defined. In this case, $R_W$ is defined as the radius in the illumination field where the local beam intensity is one-half the local intensity at the illumination field center. According to this definition, there is significant illuminance beyond the radius $R_W$, but 99% of the total beam energy falls within a radius of approximately 2.55 $R_W$. The receiver aperture location radius $R_{AL}$, shown on the vertical axis in FIG. 9, and the receiver aperture diameter $D_{RA}$ shown at various locations in FIG. 9 have been previously defined with reference to FIG. 1 and FIG. 6, respectively. Example of the receiver aperture location radius $R_{AL}$ are the receiver aperture location radius 140 shown in FIG. 1, and the receiver aperture location radius 540 described with reference to FIG. 5. One example of the receiver aperture diameter $D_{RA}$ is the receiver aperture diameter 532 described with reference to FIG. 6. These examples are provided for clarification only and are not limiting.

It should be appreciated that the results of FIG. 9 depend on the ratios between various dimensions, not the particular dimensions themselves. Therefore, the length unit used for the axes shown in FIG. 9 is arbitrary. The ratios become meaningful in design, when one element of the ratio is selected or constrained to a particular dimension for various reasons. Then the particular dimension of the complementary factor can be chosen accordingly. The line 999 includes reference marks and corresponding labels for various receiver aperture diameter values $D_{RA}$. To preserve the generality of FIG. 9, the receiver aperture diameter values $D_{RA}$ are given as a proportion of their corresponding receiver aperture location radius $R_{AL}$.

It should be appreciated that the results of FIG. 9 are for a single "ideal" detector channel. However, the actual position determination results from a readhead according to this invention are also degraded by a great number of other factors such as the balance between various phase signals, spatial harmonics in the phase signals, contamination, misalignment and the like. Nevertheless, the S/N ratios shown in FIG. 9 provide very useful design guidelines, especially for determining the performance potential of various design tradeoffs in various reasonable and similar designs.

In FIG. 9 various S/N ratio results are shown along various S/N ratio "isocurves", for various combinations of values of $R_W$ and $R_{AL}$. On each S/N isocurve there is a "peak" corresponding to the maximum value for $R_{AL}$ that is usable to obtain the S/N ratio of that S/N isocurve. Each S/N isocurve peak shown in FIG. 9 corresponding to the "maximum value" for the receiver aperture location radius $R_{AL}$, occurs at the illumination field radius $R_W$ which is optimum for that particular value of $R_{AL}$. The line 999 runs through all such S/N isocurve peaks. It should be appreciated that any particular receiver aperture location radius $R_{AL}$ (a horizontal line in FIG. 9) intersects with a corresponding point on the line 999. Any deviation of the illumination field radius $R_W$ (a vertical line in FIG. 9) that corresponds to that same point on the line 999 will produce a lower S/N ratio and worse performance for that particular receiver aperture location radius $R_{AL}$.

It should appreciated that to provide high resolution and accuracy based on the sinusoidal signals provided by an a fiber optic readhead according to this invention, it is desirable not only to count the number wavelengths or scale grating pitch units accumulated, it is also desirable to interpolate within the "initial" and "most recent" wavelength to as high a degree as possible. Generally, the interpolation level corresponds roughly to the S/N ratio, that is, with an S/N of 1, no meaningful interpolation of the peak-to-peak sinusoidal signal is possible. With a S/N ratio of 1000, approximately $1/1000^{th}$ of the peak-to-peak sinusoidal signal may be potentially be discriminated.

The S/N ratio results shown in FIG. 9, based on the previously described assumptions and design values, indicate that regardless of the receiver aperture diameter $D_{RA}$, for a given receiver aperture location radius $R_{AL}$ the best "half-maximum" illumination field radius $R_W$ is approximately equal to $0.83*R_{AL}$. FIG. 9 further indicates that reducing the "half-maximum" illumination field radius $R_W$ to approximately $0.5*R_{AL}$, or increasing the "half-maximum" illumination field radius $R_W$ to approximately $1.7*R_{AL}$, produces an S/N ratio that is approximately one-half of that provided at $0.83*R_{AL}$, which is a significant and undesirable reduction of the S/N ratio in various exemplary embodiments according to this invention. Thus, in various exemplary embodiments according to this invention, the "half-maximum" illumination field radius $R_W$ is equal to at least $0.5*R_{AL}$ and equal to at most $1.7*R_{AL}$. However, it should be appreciated that in various other exemplary embodiments, a self-imaging fiber optic readhead according to this invention retains various advantages even when the receiver illumination field radius $R_W$ is less than $0.5*R_{AL}$ or more than $1.7*R_{AL}$. For example, particularly advantageous assembly methods and small size are possible with a self-imaging fiber optic readhead according to this invention, as described further below.

The results shown in FIG. 9 also indicate the S/N ratio effect of the receiver aperture diameter $D_{RA}$ in relation to a receiver aperture location radius $R_{AL}$. As can be seen by descending to the left along the line 999, when the receiver aperture diameter $D_{RA}$ approaches the value of the receiver aperture location radius $R_{AL}$ (a relatively large receiver aperture), the S/N ratio can approach 1000. As shown along the line 999, when the ratio of the receiver aperture diameter $D_{RA}$ to the receiver aperture location radius $R_{AL}$ is greater than approximately 1/3, a S/N ratio a little greater than 100 is provided according to the assumptions used to determine the results shown in FIG. 9. For a scale grating pitch of 10 microns divided by a S/N ratio of one hundred, when the various other practical considerations discussed above are excluded, the potential resolution and accuracy are on the order of 0.1 um. In various exemplary embodiments according to this invention, it is undesirable to settle for poorer levels of potential performance. Thus, in various exemplary embodiments according to this invention, a receiver aperture diameter $D_{RA}$ should be greater than or equal to 1/3 of that receiver aperture's location radius $R_{AL}$.

As shown along the line 999, when the ratio of the receiver aperture diameter $D_{RA}$ to the receiver aperture location radius $R_{AL}$ drops further to approximately 1/5, the S/N ratio drops by a factor of approximately 2. That is, as the ratio $D_{RA}/R_{AL}$ drops from 1/3 to 1/5, the potential performance in a fiber optic readhead according to this invention drops by a factor of approximately 2. However, relaxing the $D_{RA}/R_{AL}$ ratio to this level may allow useful design flexibility and/or more economical components or assembly, while still allowing sub-micron-level performance along with the miniature size and various other advantages available with a self-imaging fiber optic readhead according to this invention. Therefore, in various other exemplary embodiments according to this invention, a receiver aperture diameter $D_{RA}$ should be greater than or equal to 1/5 of that receiver aperture's location radius $R_{AL}$.

As the ratio $D_{RA}/R_{AL}$ drops further from 1/5 to 1/8, the S/N ratio drops by a further factor of approximately 2 to 3. However, relaxing the $D_{RA}/R_{AL}$ ratio to this level may allow still more useful and economical design and assembly flexibility, while still allow micron-level performance along with the miniature size and various other advantages available with a self-imaging fiber optic readhead according to this invention. Therefore, in various other exemplary embodiments according to this invention, a receiver aperture diameter $D_{RA}$ should be greater than or equal to 1/8 of that receiver aperture's location radius $R_{AL}$.

When the receiver aperture diameter $D_{RA}$ drops to less than 1/8 of that receiver aperture's location radius $R_{AL}$, the performance potential of a self-imaging fiber optic readhead according to this invention is not remarkable compared to other much larger commercially available encoder read heads, but it's size remains remarkable in comparison to such encoder readheads. Furthermore, it's size, and/or resolution and accuracy, and/or robustness of operation remain remarkable compared to prior art fiber encoders which use other physical or optical principles. Furthermore, particularly advantageous assembly methods are possible with a self-imaging fiber optic readhead according to this invention, as described further below. Thus, in various exemplary embodiments, a self-imaging fiber optic readhead according to this invention retains various advantages even when the receiver aperture diameter $D_{RA}$ drops to less than 1/8 of that receiver aperture's location radius $R_{AL}$.

The inventor has also determined that relatively ideal self-images are present only relatively close to the center of an illumination field arising from a light source that is point source in various exemplary embodiments according to this invention. In such cases, as a receiver aperture's location radius $R_{AL}$ is increased, the available self image according to this invention exhibits increasingly non-ideal changes in visibility and spatial phase at increasing radius from the center of the illumination field. Indeed, the most widely known references on self-imaging make assumptions that restrict their validity to the center of a self-image illumination field. Thus, without negating the validity of the foregoing discussion regarding S/N ratios in a self-imaging fiber optic readhead according to this invention, in various exemplary embodiments, the receiver aperture's location radius $R_{AL}$ is also made as small as other design, assembly and cost tradeoffs allow.

Figure 10:
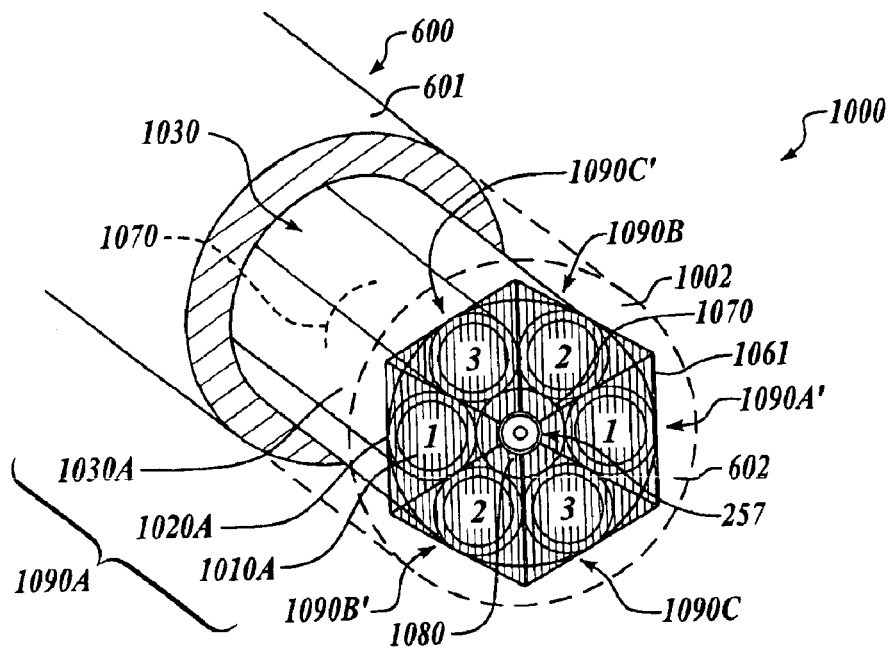
FIG. 10 is a partly orthographic, partly isometric view of a fourth embodiment of a fiber-optic readhead arrangement according to this invention.

FIG. 10 shows a fourth exemplary embodiment of a fiber-optic readhead arrangement 1000 according to this invention. The fiber-optic readhead arrangement 1000 operates substantially similarly to the generic fiber-optic readhead arrangement 300 described above with reference to FIG. 3 and includes components similar to those described above with reference to FIG. 5. Due to these similarities in configuration and operation, only certain aspects of the fiber-optic readhead arrangement 1000 that require additional explanation, are described below.

As shown in FIG. 10, the fiber-optic readhead arrangement 1000 includes a first set of three fiber-optic receiver channels 1090A–1090C, which operate similarly to the previously described fiber-optic receiver channels 190. It should be appreciated that the fiber-optic readhead arrangement 1000 provides a first example of a "balanced pair" fiber optic readhead according to this invention. To provide a balanced pair fiber optic readhead according to this invention, the fiber-optic readhead arrangement 1000 includes a second set of three respective balanced fiber-optic receiver channels 1090A'–1090C' that are respectively arranged in "balanced pairs" on opposite sides of the illumination field center 257 from the respective fiber-optic receiver channels 1090A–1090C as shown. The pairs of numbers 1—1, 2—2, and 3—3 shown on the optical fiber receiver apertures 1010 are indicative of the balanced pairs.

Also shown in FIG. 10 is a readhead housing 600 comprising a cylindrical ferrule 601, shown partially in dashed outlined cutaway. The inner diameter of the ferrule fits with a slight interference fit over the close-packed optical fibers 1030 and 1070. In one exemplary assembly method, the fibers are inserted and aligned in the ferrule 601 from the back end and inserted until they protrude slightly beyond a mounting surface 602. The fibers are then bonding to the ferrule and each other. The fibers are then ground and polished flush with the mounting surface 602. Then, the phase mask element 1061 is aligned to the fiber ends under a microscope and bonded tight to the mounting surface 602. In one exemplary embodiment, the phase masks 1020 are fabricated on the "inside" of the phase mask element 1061, nearest the fiber ends. The hexagonally shaped phase mask element 1061 is described in detail with reference to FIG. 11, below.

A light source 1080 is provided by the end of a source fiber 1070. In one exemplary embodiment, the source fiber 1070 is a single mode fiber used as a point source for emitting light at a source wavelength of 635 nm, and is the optical fiber part number FS-SN-3224 made by 3M Corporation, that has an outer diameter of $D_{SF}$=250 microns. The receiver optical fibers 1030 are all the same commercially available multimode fiber that is a silica fiber with 200/220/250 micron core/cladding/buffer diameters $D_{RA}/D_{RC}/D_{RF}$. Thus, all of the source and receiver fibers in the fiber-optic readhead arrangement 1000 have the same 250 micron outer diameter and can therefore be arranged in an advantageous close packing assembly arrangement according to this invention that allows both highly accurate and economical precision alignment and assembly. In this exemplary embodiment, the advantageous close packing assembly arrangement is a hexagonal close packing assembly arrangement.

It will be appreciated that in comparison to the 3-fiber receiver arrangement used in the fiber-optic readhead arrangement 500 shown in FIG. 5, the balanced 6-fiber receiver arrangement of this embodiment provides twice as much received light, and therefore twice the potential signal strength. Furthermore, the balanced pair arrangement of the receiver apertures 1010 rejects certain errors due to readhead misalignment to further increase measurement accuracy. A detailed discussion of reducing yaw related errors follows below with reference to FIG. 13.

It should be appreciated that an assembly such as the fiber-optic readhead arrangement 1000 provides a high resolution all optical encoder readhead in a diameter of 1.0 mm or less. It should be appreciated further that the arrangement provides low-cost precision "self-assembly". It should also be appreciated that the source fiber 1070 is intentionally "oversized" solely for these assembly purposes. The fiber-optic readhead arrangement 1000 also provides a high level S/N ratio according to the design principles discussed with respect to FIG. 9.

For example, for a flat end of the exemplary optical fiber part number FS-SN-3224 made by 3M Corporation as described above, it has been determined that the divergence half-angle for the "half-maximum" beam radius is approximately 4.5 degrees. Thus, in one exemplary embodiment of the fiber-optic readhead arrangement 1000, for a reflective scale grating 80 and a self-imaging gap of approximately 1.6 mm, $R_W$ is approximately equal to tan(4.5)*2*1.6 mm=253 microns. For the exemplary optical fiber characteristics and dimensions described above and a close-packing embodiment of the fiber-optic readhead arrangement 1000, $R_{AL}$ is approximately equal to 250 microns. Thus, $R_W$ approximately equals $R_{AL}$ and is not far from the value of 0.83*$R_{AL}$ previously discussed with reference to FIG. 9. Furthermore, $D_{RA}$=200 microns, which is approximately ⅘*$R_{AL}$. According to the information shown in FIG. 9, with such design relationships, each optical fiber receiver channel should provide a S/N ratio significantly greater than 640. Considering that the fiber-optic readhead arrangement 1000 provides two balanced optical fiber receiver channels for each electronic detector, this value can be approximately doubled, to greater than approximately 1280. Experimentally, the inventor has demonstrated stable position readings with a comparable readhead arrangement of this type at a resolution of 1 nanometer using a scale grating having an 8 micron grating pitch.

Figure 11:
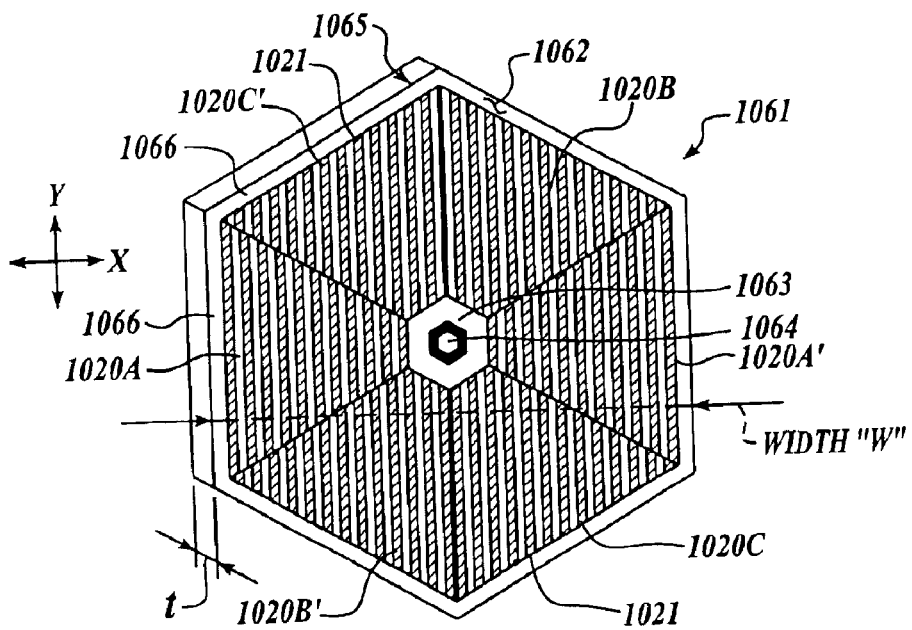
FIG. 11 shows an exemplary phase mask element usable in various fiber-optic readhead arrangements according to this invention.

FIG. 11 shows an exemplary phase mask element 1061 usable in the fiber-optic readhead arrangement 1000 and various other readhead arrangements according to this invention. The phase mask element 1061 includes the phase masks 1020A–1020C and 1020A'–1020C'. Each of the phase masks 1020 includes grating bars 1021 that are opaque to a readhead source light. The grating bars 1021 are arrayed on the surface 1062 of a substrate 1065 of nominal thickness t and nominal width w that is transparent to the readhead source light. Chrome, copper, and oxides thereof are common materials that may be used for patterning the grating bars 1021. Glass and quartz are common substrate materials that may be used for the substrate 1065. The substrate 1065 may have edge margins 1066 outside the active mask area to avoid damage to the grating bars during processing. The edge margins 1066 may vary in width around the mask area so that the substrate has hexagonal (as shown), circular, rectangular, or square shape to allow efficient scribing and/or dicing. The active mask area of each of the phase masks 1020A–1020C and 1020A'–1020C' is the area containing the grating bars 1021. This active mask area should be of sufficient size to cover the clear aperture area of the corresponding receiver apertures 1010 with extra tolerance for variations in assembly positioning. Shown at the center of the mask element 1061 is an alignment ring 1063 having a clear aperture 1064 for the source light from the optical fiber 1070, discussed above. The size of the clear aperture is, for example, several times greater than the single-mode core diameter previously described with reference to FIG. 7, which is on the order of $D_{SA}$=4 microns. In one exemplary embodiment the phase mask element 1061 is made of soda lime glass, has a thickness of 0.25 mm and a width of 2.0 mm, which overhangs the fiber arrangement described with respect to FIG. 10 by a substantial margin, for attachment to a ferrule 601 that has approximately a 2.0 mm outer diameter.

The mask grating bars 1021 are arranged periodically along the X-axis direction according to a period that matches that of the grating image in the operable self image plane, as previously described. The exemplary phase mask element 1061 as shown has 6 phase masks 1020 for use with 6 fiber-optic receiver channels in a balanced configuration where diametrically opposing fiber-optic receiver apertures receive the same phase of light signal modulation with x direction movement of the readhead relative to the scale. The phase masks 1020 have phases of 0 degrees (1020A and 1020A'), 120 degrees (1020B and 1020B'), and 240 degrees (1020C and 1020C'). The signal processing for the resulting signals in the corresponding fiber-optic receiver channels is discussed further below. The boundary between the various phase masks 1020 is easily visible under a microscope for a phase mask element constructed with grating bars 1021 usable in a self image encoder. These can be used to align the phase mask element 1061 relative to the receiver fibers. The inventor has found that alignments within tolerances less than 20 microns are easily achievable using a microscope and an XYZ micrometer stage to position the phase mask element 1061 relative to the receiver fibers.

Figure 12:
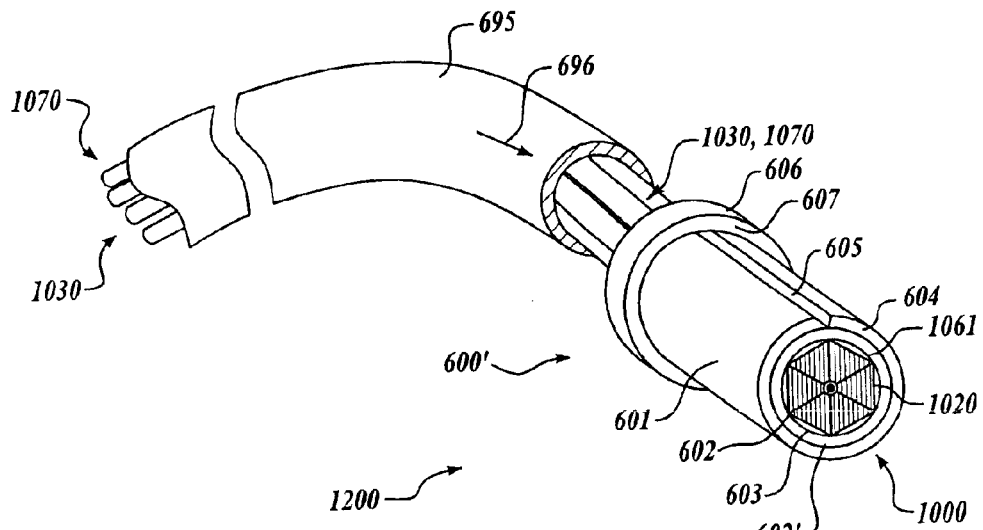
FIG. 12 shows a first exemplary embodiment of a fiber-optic readhead and cable according to this invention.

FIG. 12 shows a first exemplary embodiment of a fiber-optic readhead and cable 1200 according to this invention. The fiber-optic readhead and cable 1200 operates substantially similarly to the generic fiber-optic readhead arrangement 300 described above with reference to FIG. 3 and includes the fiber-optic readhead arrangement 1000 described with reference to FIG. 10. Due to these similarities in configuration and operation, only certain aspects of the readhead housing 600' and the cable 695 will be described below.

As shown in FIG. 12, the fiber-optic readhead and cable 1200 incorporates the "balanced pair" fiber-optic readhead arrangement 1000. The readhead housing 600' includes a ferrule 601 having an inner diameter 603 which is appropriately sized according to the close packing assembly methods previously described. The mounting surface 602 in this embodiment may be surrounded by a small extended collar, such that the phase mask element 1061 is recessed relative to an end surface 602', thus protecting the surface of the phase mask element 1061 from damage. The end surface 602' may also include a chamfer 604 so that the readhead housing 600' is easier to insert into a mounting hole. The readhead housing 600' further includes a mounting stop 606 for stopping the readhead housing 600' at the proper depth in a mounting hole, for example, to aid in establishing a desirable self-imaging gap. The mounting stop 606 and ferrule 601 may be a single piece or an assembly. The ferrule 601 includes an alignment groove 605 which aids mounting alignment in various applications. The alignment groove 605 is relatively precisely aligned with respect to the orientation of the bars of the phase masks 1020. The optical fibers 1030 and 1070 extend from the back of the ferrule 601 and/or mounting stop 606 and into a readhead cable 695 shown in cutaway, which is a typical commercial fiber optic bundle jacket in various exemplary embodiments. As indicated by the arrow 696, the jacket of the cable 695 is inserted and bonded into an enlarged diameter at the rear of the readhead housing 600' and fixed in place by adhesive or the like to provide protection and strain relief for the various optical fibers. As previously discussed the cable 695 may extend for tens of meters or more in various applications without appreciable signal loss.

Thus, the fiber optic readhead and cable 1200 provides a miniature fiber optic readhead usable in an industrial environment. It should be appreciated that the outer diameter of the readhead housing ferrule 601 and/or mounting stop 606 may easily be made as small as 1 to 2 mm. Thus, in one exemplary embodiment, the readhead housing 600', or a remote end of the cable 695, or both, are assembled into industry standard PM-FC connectors for further installation, mounting, alignment and connection.

Figure 13:
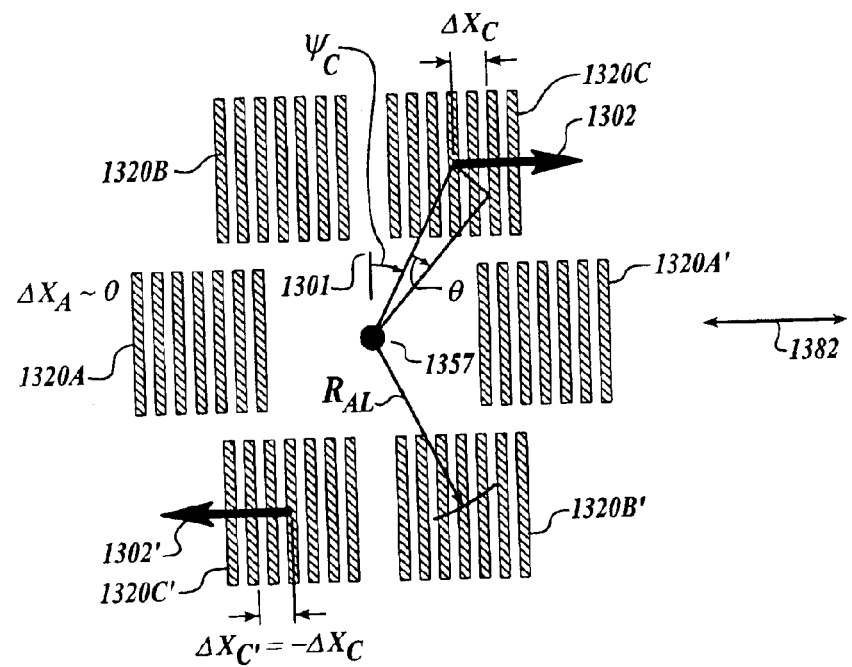
FIG. 13 is a diagram illustrating a yaw misalignment consideration relevant to various exemplary embodiments according to this invention.

FIG. 13 is a diagram illustrating a yaw misalignment consideration relevant to various exemplary embodiments according to this invention. As shown in FIG. 13, six fiber-optic receiver channels, schematically represented by the six corresponding phase masks 1320A–C and 1320A'–C', are arranged in a pattern around a nominal illumination field center 1357, similar to various exemplary embodiments discussed previously. In this example, the illumination field center 1357 is also assumed to be a rotation center 1357 of a rotational yaw misalignment, described in detail below. Each fiber-optic receiver channel is located at a receiver aperture location radius $R_{AL}$, and at a respective location angle $\psi_i$ from the line 1301 that extends orthogonal to the measurement direction 1382 and through the rotation center 1357. For this geometry, a rotational yaw misalignment of θ will result in a respective shift of $\Delta x_i$ in the location of each phase mask 1320i along the direction of motion 1382. For fiber-optic receiver channel having a respective angle $\psi_i$ and the receiver aperture location radius $R_{AL}$, the shift $\Delta x_i$ will be $$\Delta x_i = R_{AL} \theta \cos \psi_i \qquad (Eq. 4)$$

For a given yaw misalignment θ, phase masks 1320i located relative to the rotation center 1357 along a direction corresponding to the measurement direction 1382, such as the phase masks 1320A and 1320A', will have little or no shift ($\Delta x_A = \Delta x_D \mp 0$), while phase masks 1320i located relative to the rotation center 1357 along a direction parallel to the line 1301, such as the phase masks 1320B, 1320C, 1320B' and 1320C', will have a relatively large shift $\Delta x_i$. Each shift $\Delta x_i$ in a phase mask location will cause a spatial phase location error for that phase mask 1320i and a corresponding phase error in the signal of the corresponding fiber-optic receiver channels. Both the shift $\Delta x_i$ and the corresponding signal phase error are of the same magnitude and in opposite directions for "balanced pair" phase masks 1320i and 1320i' on opposite sides of the illumination field center/rotation center 1357, as indicated by the direction of the arrows 1302 and 1302' on the phase masks 1320C and 1320C'. Thus, when balanced pair fiber-optic receiver channels are summed, either optically or electronically, as discussed above with reference to FIG. 8, signal phase errors due to the rotational yaw misalignment θ are cancelled. Similarly, certain other signal errors due to rotational roll and pitch misalignments are cancelled when balanced pair fiber-optic receiver channels are summed. In addition, optically summing balanced pair fiber-optic receiver channels provides the further advantage of increasing signal levels without increasing electronic noise.

In one exemplary embodiment of the balanced pair fiber-optic readhead arrangement shown schematically in FIG. 13, the fiber-optic receiver channel signals corresponding to the phase masks 1320A and 1320A' can both have a nominal phase of zero degrees and can be optically summed to yield a photodetector signal $U_R$. Similarly, the fiber-optic receiver channel signals corresponding to the phase masks 1320B and 1320B' can both have a nominal phase of 120 degrees and can be optically summed to yield a photodetector signal $U_S$ and the fiber-optic receiver channel signals corresponding to the phase masks 1320C and 1320C' can both have a nominal phase of 240 degrees and can be optically summed to yield a photodetector signal $U_T$. These signals can then be processed to yield quadrature signals $Q_1$ and $Q_2$ by using the following equations:

$$Q_1 = \frac{U_T - U_S - (1 - 2\cos\alpha)(U_R - U_S)}{\cos\alpha - 1} \quad \text{(Eq. 5)}$$

$$Q_2 = \frac{U_T - U_S + (1 + 2\cos\alpha)(U_R - U_S)}{\sin\alpha} \quad \text{(Eq. 6)}$$

where $\alpha=120$ degrees. It should be appreciated that in various embodiments, the value of $\alpha$ may be adjusted slightly during signal processing, as a calibration or compensation factor to provide compensation for various phase errors that occur due to fabrication inaccuracies and the like. Similar alternative equations may also be used. Such alternative equations allow for a different choice of phase for the three channels, as long as the relationship between the difference in phase for two of the channels (i.e., 240 degrees for channel pairs A/A' compared to channel pairs C/C') is twice the difference in phase for different sets of channels (i.e., 120 degrees for channel pairs A/A' compared to channel pairs B/B'). Therefore, an alternative set of phases that can be used for the phase masks 1320A–C and 1320A'–C' are 0, 100 and 200 degrees, although advantages in removing third harmonics from the quadrature signals are decreased with this alternative set of phases, as discussed below.

A measured readhead position X can then be determined from the foregoing quadrature signals using a two-argument arctangent function that is modulo $2\pi$:

$$X = (P_g/2\pi) * \operatorname{atan}(Q_1, Q_2) \quad \text{(Eq. 7)}$$

where $P_g$ is the grating pitch of a scale grating, such as the previously described scale grating 80, or the like, that is used with a fiber-optic readhead according to this invention. The two-argument "atan" function shown in EQUATION 7 is available and described in a number of publicly available mathematical programs. The function result is the arctangent of $Q_1/Q_2$, in radians. However, the use of two arguments allows the determination of the quadrant of the resulting angle, so that the result is between –pi and +pi rather than –pi/2 and +pi/2. More generally, it should be appreciated that numerous different equations can be used for converting phase signals to position measurements, as discussed further below.

In various other fiber-optic readhead embodiments that provide a set of fiber-optic receiver channel signals having four different phases, each signal differing in phase from another signal by a constant phase amount a, the Carré technique can be applied. See, for example, Gary Cloud, "Optical Methods of Engineering Analysis", Cambridge University Press, 1998, p. 488–489, which is incorporated herein by reference for all of its relevant teachings. The Carré technique is often used in multi-wavelength interferometry, but may also be applied to phase signals provided in various exemplary embodiments according to this invention.

It should be appreciated that perfectly sinusoidal phase signals are difficult to achieve in practice, and that deviations from a perfect sinusoidal output contain spatial harmonics of the fundamental wavelength or grating pitch of a scale grating used with a fiber-optic readhead according to this invention. In particular, the dominant error content in various self-imaging encoder systems often takes the form of a third spatial harmonic. Therefore, in various exemplary embodiments according to this invention, a fiber-optic encoder readhead having a three phase configuration is used. It should be appreciated that in such embodiments the third spatial harmonic error content in the various individual fiber-optic receiver channel signals can be largely eliminated as a source of position measurement error, by performing signal processing corresponding to EQUATIONS 5 and 6 in order to determine the position measurement value. At the same time, a 50% duty cycle can be used for the various phase masks.

In various other exemplary embodiments, a fiber-optic encoder readhead having a two phase or four phase configuration can be used. However, in such embodiments, it may be necessary in various applications to use a 33% duty cycle for the various phase masks, in order to reduce third spatial harmonic error content to acceptable levels in the various individual fiber-optic receiver channel signals. However, in such applications this has the disadvantage of lowering signal levels slightly over the signal levels achievable when using a 50% duty cycle for the various phase masks.

In general, many alternative combinations of phases may be used in various alternative phase mask embodiments according to this invention. TABLE 2, below, lists a few examples of the various combinations of phases that are usable with the exemplary fiber-optic readhead phase mask layout shown schematically in FIG. 13. Balanced pair configurations may be used in various exemplary embodiments listed in TABLE 2, or may not be used in various other exemplary embodiments. In various other exemplary embodiments, some phase mask positions may not actively be used, but fibers may be included at such phase mask positions in the corresponding fiber-optic readhead embodiments, to act as passive spacers for assembly purposes. In general, the configurations listed in TABLE 2 are indicative of a further number of alternative configurations. For example, configurations that do not used balanced pairs may have the spatial phase values in the various phase sets permuted to any possible combination of phase mask positions, provided that appropriate signal processing is used to determine the corresponding position measurement values. Similarly, balanced pair configurations may have the balanced pairs permuted to any possible combination of phase mask positions, provided that the balanced pairs remain symmetrically located on opposite sides of the center of rotation of the configuration. Phase mask positions marked with an "x" may include dummy fibers as discussed above, or may duplicate the spatial phase of one of the other phase mask position, or even include a different spatial phase value, provided that appropriate signal processing is used to determine the corresponding position measurement values.

TABLE 2

Phase Mask Phases; Properties & Processing with reference to FIG. 13 Layout.

| | FIG. 13 Phase Mask Position | | | | | Balanced Pair Configuration | Comments: Position Determination Operations |
|---|---|---|---|---|---|---|---|
| | 1320A | 1320B | 1320C | 1320A' | 1320B' | 1320C' | | |
| Spatial Phase Sets Usable at Various Phase Mask Positions | 0 ($P_0$) | 90 ($P_{90}$) | 180 ($P_{180}$) | 270 ($P_{270}$) | x | x | No | $[P_g/2\pi]^*$ $\tan^{-1}[P_{180} - P_0)/(P_{270} - P_{90})]$ |
| | 0 | α | 2α | 3α | x | x | No | Carre Technique, α~π/2 |
| | 0 | 120 | 240 | x | x | x | No | Eqs. 5, 6 and 7 |
| | 0 | α | 2α | x | x | x | No | Eqs. 5, 6 and 7 |
| | 0 | 72 | 144 | 216 | 288 | x | No | 5 phase configuration |
| | 0 | 60 | 240 | 300 | 120 | 180 | Some balance effects | 6 phase configuration |
| | 0 | 120 | 240 | 0 | 120 | 240 | Yes | Eqs. 5, 6 and 7 |
| | 0 | α | 2α | 0 | α | 2α | Yes | Eqs. 5, 6 and 7 |

Position determination calculations for the five and six phase configurations shown in TABLE 2, and for greater numbers of phases usable in various exemplary embodiments according to this invention, are known to those skilled in the art and can readily be derived for an arbitrary number of phases. In various exemplary fiber-optic readheads according to this invention, a 5 phase configuration is used, which provides one advantage in that signal error content related to higher spatial harmonics up to the $9^{th}$ spatial harmonic can be compensated and/or removed. In various other exemplary fiber-optic readheads according to this invention, a 3 or 6 phase configuration is used, which provides similar advantages in that signal error content related to higher spatial harmonics compensated and/or removed. However, such 3 or 6 phase fiber-optic readhead configurations generally cannot compensate and/or remove the error content associated with the fifth and seventh spatial harmonics.

Figure 14:
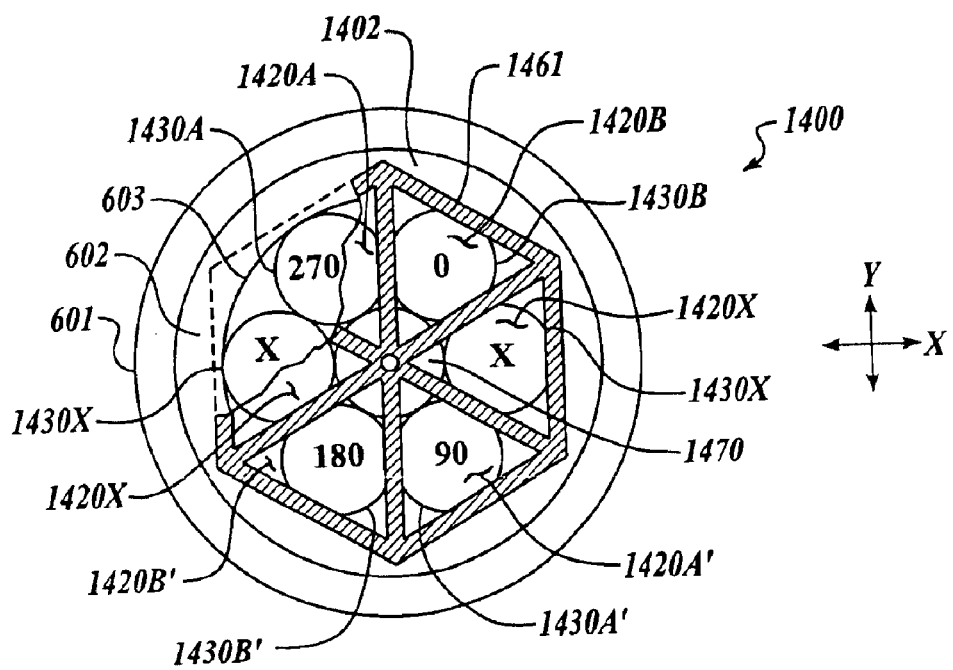
FIG. 14 shows a fifth exemplary embodiment of a fiber-optic readhead arrangement according to this invention.

FIG. 14 shows a fifth exemplary embodiment of a fiber-optic readhead arrangement 1400 according to this invention. A hexagonal phase element mask 1461 is mounted to a mounting surface 602 of a readhead housing ferrule 601 that has in inner diameter 603 that provides good alignment for 6 optical receiver fibers 1430 in a close packed arrangement surrounding one source fiber 1470, as previously described with respect to the fiber-optic readhead arrangement 1000 shown in FIG. 10. It should be appreciated that the two "receiver" fibers 1430x are dummy fibers and are used only for assembly purposes in this embodiment—serving to locate the remaining active fibers by providing a the close packing geometry. The four remaining phase masks 1420A, 1420A', 1420B and 1420B' and respective receiver apertures and fibers are arranged to provide traditional quadrature phases signals that have relative spatial phases of 270, 90, 0 and 180 degrees, respectively, as shown. These are analyzed for position determination using an equation similar to that given in TABLE 2 for these four spatial phases, or by any other known quadrature signal processing method. The fiber-optic readhead arrangement 1400 does not include the benefits of a balanced pair fiber-optic receiver channel configuration in decreasing rotational misalignment errors, since the fiber-optic receiver channels on opposite sides of the fiber-optic readhead arrangement 1400 have their signals subtracted instead of added. Another aspect of this embodiment is the addition of opaque margins between and surrounding the various phase masks 1420. Such opaque margins help prevent stray light from leaking into the cladding material to inadvertently reach the photodetectors shown in FIG. 8. Also, the margins may help prevent the spatially filtered light near the edges of adjacent phase masks from leaking into adjacent optical fiber signal channels and causing associated signal errors.

Figure 15:
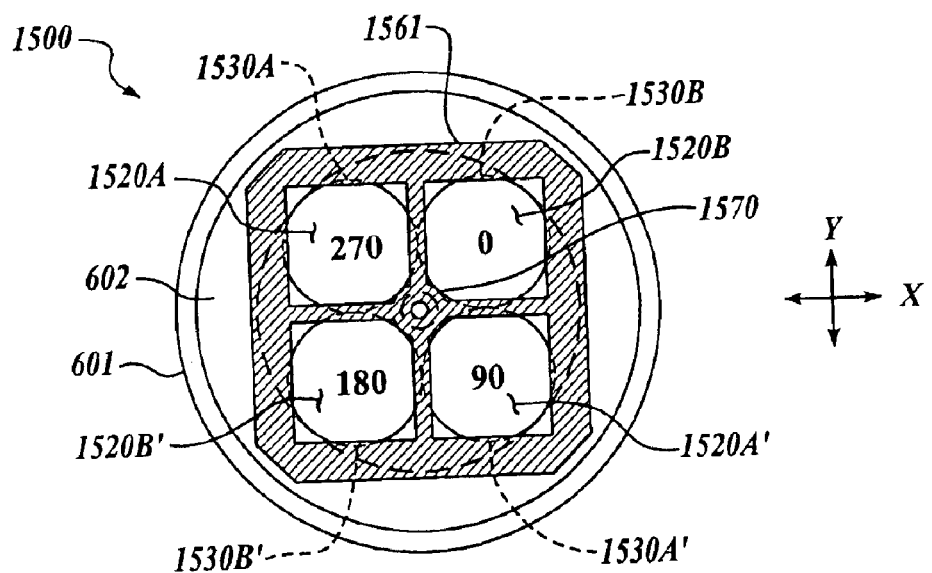
FIG. 15 shows a sixth exemplary embodiment of a fiber-optic readhead arrangement according to this invention.

FIG. 15 shows a sixth exemplary embodiment of a fiber-optic readhead arrangement 1500 according to this invention, which is constructed similarly to the fiber-optic readhead arrangement 1400, described with reference to FIG. 14. The fiber-optic readhead arrangement 1500 includes a square phase mask element 1561 mounted to a mounting surface 602 of a readhead housing ferrule 601. The mask element 1561 includes phase masks 1520A, 1520A', 1520B and 1520B', respective receiver fibers 1530A, 1530A', 1530B and 1530B' and a source fiber 1570, all arranged inside the readhead housing ferrule 601 to provide traditional quadrature phases signals that have relative spatial phases of 270, 90, 0 and 180 degrees, respectively, as shown. The fiber-optic readhead arrangement 1500 is a four phase embodiment similar to that shown in FIG. 14. In this case, a more efficient arrangement using fewer components is made by using dissimilar fiber diameters for the source fiber 1570 and the receiver fibers 1530A, 1530A', 1530B and 1530B'. A square "close packed" arrangement is thereby achieved for assembling the receiver fibers and the receiver aperture location radius $R_{AL}$ is reduced relative to that provided in the arrangement shown in FIG. 14. Thus, the configuration shown in FIG. 15 efficiently provides a relatively improved S/N ratio, according to the principles previously discussed with reference to FIG. 9. In various exemplary close packing embodiments using this configuration, the source fiber diameter $D_{SF}$ is related to the receiver fiber diameter $D_{RF}$ as follows: $D_{SF}$= 0.4142 $D_{RF}$.

In general, a wide variety of alternative close-packed fiber-optic readhead configurations may be determined for a source fiber surrounded by n receiver optical fibers having an outer fiber diameter $D_{RF}$. For such close-packed fiber-optic readhead configurations the source fiber outer diameter $D_{SF}$ is determined according to $$D_{SF} = D_{RF}\left(\frac{1}{\sin(180°/n)} - 1\right) \quad \text{(Eq. 8)}$$

Such close-packed fiber-optic readhead configurations having n receiver optical fibers packed around one source optical fiber can provide any practical number of fiber-optic receiver channels such that the receiver aperture for each channel is located at a similar receiver aperture location radius $R_{AL}$ away from the center of the arrangement. Such configurations tend to provide inherently balanced signals from the various fiber-optic receiver channels, which is a desirable feature in various exemplary embodiments according to this invention. In various exemplary embodiments, n may be increased so that some fiber-optic receiver channels may redundantly provide the same phase signals. In various exemplary embodiments, such redundant signals may be optically added to increase signal strength or decrease the effects of various misalignments or assembly tolerances or to provide other performance advantages. However, it should be appreciated that as n increases, and particularly when n becomes greater than approximately six, the appropriate outer diameter of the central source optical fiber increases and the receiver aperture location radius $R_{AL}$ increases, potentially decreasing the signal strength in the encoder. Thus, in such cases, the various design relationships previously discussed with reference to FIG. 9 should also be considered.

In one alternative embodiment (not illustrated), by using readhead housing ferrule having a square hole to receive the various optical fibers, square packing of fibers may be used in a configuration where one source optical fiber is surrounded by eight receiver optical fibers and all of the optical fibers have the same outer diameter. For example, electric discharge machining may be used to produce a square hole of side s through a readhead housing ferrule. Nine fibers of diameter s/3 may be inserted through the hole in 3 rows of 3, the central fiber being the source fiber surrounded by 8 receiver fibers. One possible arrangement of spatial phases is a four phase balanced pair optical-fiber receiver configuration, with like spatial phases located on opposite sides of the centrally located source optical fiber. For example, the 0 and 180 degree spatial phase receiver channels can be respectively positioned along the two diagonals of the square, and the 90 and 270 degree spatial phase receiver channels can be respectively positioned along the two orthogonal directions associated with the remaining four optical fiber receiver positions. Such a four phase balanced pair optical-fiber receiver configuration provides the previously described compensation and/or removal of errors related to various rotational misalignments, as well as DC offset cancellation for the phase signals that are combined by subtraction (see TABLE 2.) As the difference between the zero and 180 degree phase signals is determined to provide for DC offset correction, it is beneficial that these optical-fiber receiver channels are located at an equal distance from the source, as provided in the description above. Similarly, since the difference between the 90 and 270 degree phase signals is determined to provide for DC offset correction, it is beneficial that these optical-fiber receiver channels are located at an equal distance from the source, as provided in the description above.

It should be appreciated that, as an alternative to increasing the number of receiver fibers surrounding a single light source, in various exemplary embodiments each of the foregoing optical fiber readhead configurations can provide a physical layout that is replicated or combined in a readhead according to this invention. As one illustrative example, the basic configuration shown in FIG. 15 can be "extended" by duplicating the entire illustrated optical fiber configuration in an adjacent location along the X and/or Y directions, to provide two sets of four receiver fibers arranged around two respective light sources. Such a configuration can be arranged in a close packed manner in a rectangular ferrule housing, or in two "overlapping" circular bores, or the like. Furthermore, single extended phase mask element can be used for both of the two sets of four receiver fibers arranged around respective light sources. In such an extended phase mask element, the phases of the individual receiver channel phase masks can be replicated similarly to the optical fiber configurations, or, alternatively, the phases of the individual receiver channel phase masks can be "rearranged" or otherwise selected in the extended phase mask element, to provide alternative balanced pair receiver channel configurations, alternative phase signals, or the like. It should be appreciated that such extended and/or duplicated optical fiber configurations provide a high S/N ratio according to the principles previously discussed with reference to FIG. 9 and offer additional design alternatives and advantages in various exemplary embodiments according to this invention.

Figure 16:
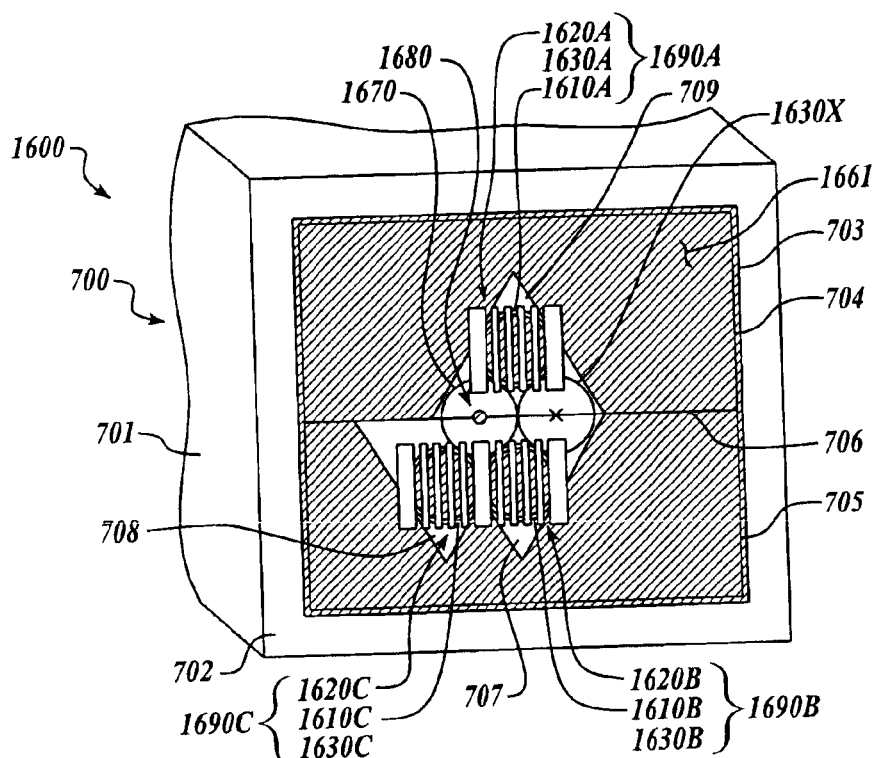
FIG. 16 shows a seventh exemplary embodiment of a fiber-optic readhead arrangement according to this invention.

FIG. 16 shows a seventh exemplary embodiment of a fiber-optic readhead arrangement 1600 according to this invention, which operates similarly to the 3 phase fiber-optic readhead arrangement 500 described above with reference to FIG. 5. Due to similarities in configuration and operation, only certain aspects of the fiber-optic readhead arrangement 1600 that require additional explanation, are described below.

As shown in FIG. 16, the fiber-optic readhead arrangement 1600 includes three fiber-optic receiver channels 1690A–1690C, which operate similarly to the previously described fiber-optic receiver channels 190. For example, the fiber-optic receiver channel 1690A includes a receiver channel aperture 1610A, a phase mask 1620A, and a receiver optical fiber 1630A (not shown). The other fiber-optic receiver channels 1690B and 1690C include similar elements that are similarly numbered. Also included is a phase mask element 1661 of a transparent material, upper V-groove alignment element 704 and lower V-groove alignment element 705, and a light source 1680 provided by the end of a source optical fiber 1670.

The phase mask element 1661 is constructed similarly to the previously discussed phase mask element 561, except the 3-phase configuration phase masks 1620A, 1620B and 1620C are respectively located over the positions of the receiver channel apertures 1610A, 1610B and 1610C, which are dictated by the V-groove 709 of the upper V-groove alignment element 704, and the V-grooves 707 and 708 of the lower V-groove alignment element 705, respectively. In various exemplary embodiments, the phase masks 1620A, 1620B and 1620C have corresponding spatial phases of 0, 120 and 240 degrees, respectively.

Also shown in FIG. 16 is a readhead housing 700 comprising a rectangular ferrule 701. The rectangular ferrule 701 fits snugly over the upper V-groove alignment element 704 and lower V-groove alignment element 705 when they are abutted at their interface 706 and properly aligned and inserted into the rectangular hole through the rectangular ferrule 701. In one exemplary embodiment the V-groove alignment elements 704 and 705 are silicon V-groove alignment elements of the type commercially available and used for fiber optic alignment in the telecommunications industry. The V-grooves 707–709 are fabricated such that when the upper V-groove alignment element 704 and lower V-groove alignment element 705 are properly aligned and constrained within the rectangular ferrule 701, the various operating optical fibers 1670 and 1630A–C positioned within the upper and lower V-groove alignment element 704 and 705 are constrained in a close packing configuration. The benefits generally associated with such a close packing configurations have been previously described. A dummy optical fiber 1630X is included in the assembly as a convenient and economical way to constrain the other operating optical fibers 1670 and 1630A–C in their proper positions.

In one exemplary assembly method, the fibers are inserted and aligned in the upper and lower V-groove alignment elements 704 and 705, which are then lightly compressed together at the interface 706 and into the back of the rectangular hole through the rectangular ferrule 701. The various operating optical fibers 1670 and 1630A–C may protrude slightly from the front of the V-groove alignment elements 704 and 705. The various fibers and the V-groove alignment elements 704 and 705 are then bonded to the ferrule 701 and to each other. The various fibers are then ground and polished flush with the front surfaces of the V-groove alignment elements 704 and 705. Then, the phase mask element 1661 is aligned to the fiber ends under a microscope and bonded tight to the front surfaces of the V-groove alignment elements 704 and 705 and/or the ferrule 701. In one exemplary embodiment, the phase masks 1020 are fabricated on the "inside" of the phase mask element 1661, nearest the fiber ends.

It should be appreciated that an assembly such as the fiber-optic readhead arrangement 1600 provides a high resolution all optical encoder readhead with overall width and height dimensions on the order of two to three millimeters or less. It should be appreciated further that the arrangement provides low-cost precision "self-assembly". It should also be appreciated that the source fiber 1670 is intentionally "oversized" and a dummy optical fiber is included, solely for these assembly purposes. The fiber-optic readhead arrangement 1600 also provides a high level S/N ratio according to the design principles discussed with respect to FIG. 9.

Figure 17:
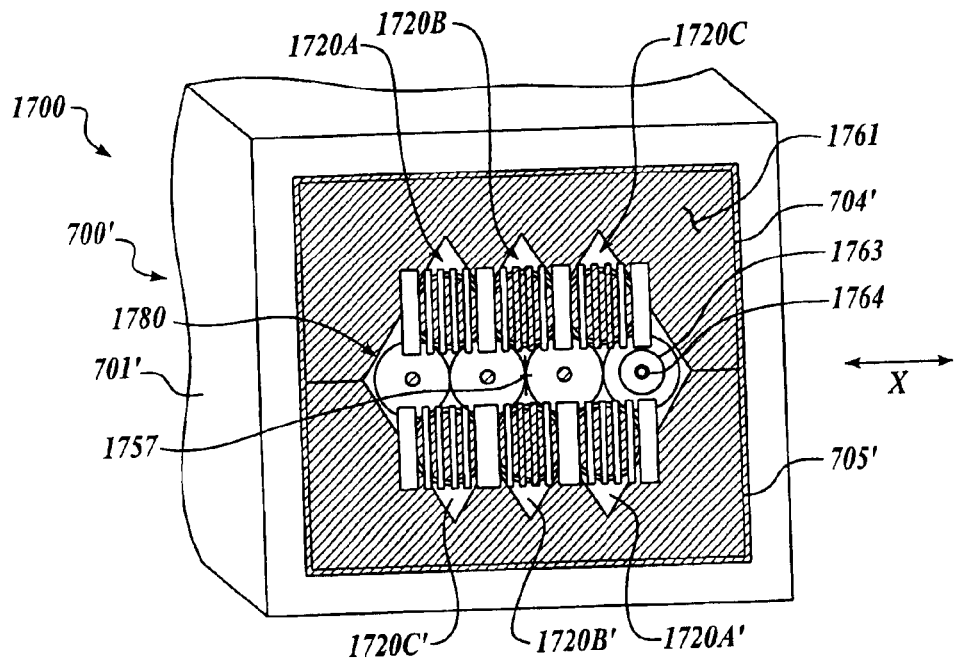
FIG. 17 shows an eighth exemplary embodiment of a fiber-optic readhead arrangement according to this invention.

FIG. 17 shows an eighth exemplary embodiment of a fiber-optic readhead arrangement 1700 according to this invention which includes a plurality of precisely spaced single mode optical fiber sources 1780 to provide increased and more uniform illumination. The optical fiber sources 1780 must be positioned to constructively add intensity in the self image, as described further below. The fiber-optic readhead arrangement 1700 includes a "balanced pair" fiber-optic receiver channel configuration comprising three balanced pairs that are generally arranged and operated according to the previously described principles for balanced pair fiber-optic receiver channels. Otherwise, the fiber-optic readhead arrangement 1700 is constructed similarly to the 3 phase fiber-optic readhead arrangement 1600 described above with reference to FIG. 16. Due to these similarities in configuration and operation, only certain aspects of the fiber-optic readhead arrangement 1700 that require additional explanation, are described below.

As shown in FIG. 17, the fiber-optic readhead arrangement 1700 includes six fiber-optic receiver channels corresponding to the six phase masks 1720A–1720C and 1720A'–1720C', which are arranged on a phase mask element 1761. The phase masks 1720A and 1720A' are indicative of a first set of balanced pair fiber-optic receiver channels symmetrically arranged on opposite sides of an illumination field center 1757, the phase masks 1720B and 1720B' are indicative of a second set of balanced pair fiber-optic receiver channels and the phase masks 1720C and 1720C' are indicative of at third set of balanced pair fiber-optic receiver channels. In various exemplary embodiments, the phase masks 1720A–A', 1720B–B' and 1720C–C' have corresponding spatial phases of zero, 120 and 240 degrees, respectively.

Also included in the fiber-optic readhead arrangement 1700 are the elements 700', 701', 704' and 705', which are similar to the similarly number elements shown in FIG. 16. The fiber-optic readhead arrangement 1700 is fabricated and assembled in a manner analogous to that previously described with reference to the fiber-optic readhead arrangement 1600 shown in FIG. 16.

The particular embodiment shown in FIG. 17 includes four single mode optical fiber sources 1780 to provide increased and more uniform illumination, relative to previous embodiments according to this invention that provide a single light source. Single mode light source optical fibers usable for the optical fiber sources 1780 have been previously described with reference to FIG. 7. In various exemplary embodiments, each of the optical fiber sources 1780 outputs source light arising from the same remote light source, which is a coherent light source such as a laser diode light source or the like.

As previously mentioned, the single mode optical fiber sources 1780 are precisely spaced relative to one another. In particular, the various optical fiber sources 1780 are precisely spaced along the "x" direction shown in FIG. 17, such that when operably positioned relative a scale grating according to the principles of this invention all of the optical fiber sources 1780 give rise to a self images that constructively add intensities in the operable self image plane. The "x" direction shown in FIG. 17 corresponds to the measuring axis direction of a scale grating used with the fiber-optic readhead arrangement 1700. The appropriate spacing for the various optical fiber sources 1780 can be determined by analysis and/or experiment, and the various fiber diameters and V-groove dimensions chosen accordingly. It should be appreciated that ideally spaced optical fiber sources 1780 will result in respective self images from an operably positioned scale grating such that the respective self images are all mutually "in phase".

In various exemplary embodiments, the phase mask element 1761 includes a light source location mask portion for each of the optical fiber sources 1780. One exemplary light source location mask portion 1763 is shown over the rightmost optical fiber source 1780 in FIG. 17. The light source location mask portion 1763 includes an opaque ring or area that is substantially larger than a clear central aperture 1764, approximately as shown. Each of the central apertures 1764 are slightly smaller than the core diameter $D_{SA}$ of each of the corresponding single mode optical fiber sources 1780, which may be on the order of 4 microns, as previously described with reference to FIG. 7. Accordingly, the spacing of the central apertures 1764 as fabricated on the phase mask element 1761 reliably and economically determines the effective spacing of the optical fiber sources 1780 in such embodiments.

It should be appreciated that an assembly such as the fiber-optic readhead arrangement 1700 provides a high resolution all optical encoder readhead with overall width and height dimensions on the order of two to three millimeters or less. It should be appreciated further that the arrangement provides low-cost precision "self-assembly". The fiber-optic readhead arrangement 1700 also provides a high level S/N ratio. It should be appreciated that each optical fiber receiver aperture included in the fiber-optic readhead arrangement 1700 receives light arising from a plurality of the optical fiber sources 1780. The design relationship of each individual optical fiber receiver aperture relative to each individual light source may be analyzed according to the design principles previously discussed with respect to FIG. 9. Thus, the S/N ratio provided by each optical fiber receiver channel based on the plurality of the optical fiber sources 1780 will be some multiple of that indicated according to the design principles previously discussed with respect to FIG. 9.

Figure 18:
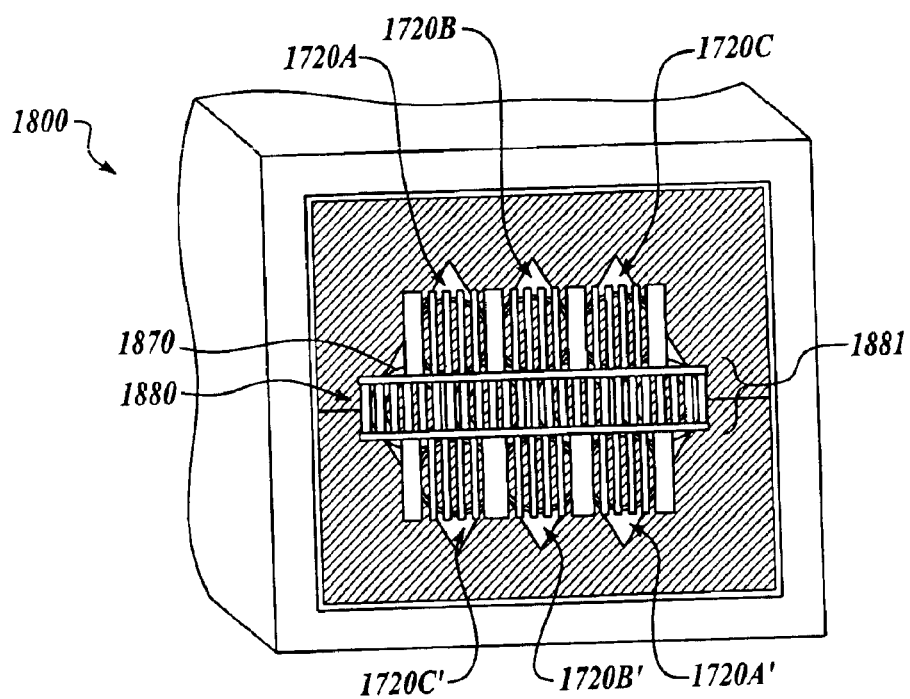
FIG. 18 shows a ninth exemplary embodiment of a fiber-optic readhead arrangement according to this invention, which uses a source grating.

FIG. 18 shows an ninth exemplary embodiment of a fiber-optic readhead arrangement 1800 according to this invention, which uses a source grating, the central grating 1881, to provide a distributed light source 1880. Otherwise, the fiber-optic readhead arrangement 1800 is constructed similarly to the fiber-optic readhead arrangement 1700 described above with reference to FIG. 17. Due to these similarities in configuration and operation, only certain aspects of the fiber-optic readhead arrangement 1800 that require additional explanation, are described below.

The source light from the distributed light source 1880 shown in FIG. 18 differs from that provided by the optical fiber sources 1780 shown in FIG. 17 in that the source light provided for the fiber-optic readhead arrangement 1800 is provided from an LED or other light source having low spatial coherence, as described further below. It should be appreciated that, in contrast to the light source optical fibers used in various previously described exemplary embodiments, the source fibers 1870 shown under the central grating 1881 have a relatively large "multi-mode" core diameter $D_{SA}$, which is suitable for efficient coupling to one or more remote LED light source(s) or other suitable low-coherence light sources. Accordingly, the source fibers 1870 may be multimode fibers having a relatively large core diameter $D_{SA}$. Alternatively, the source fibers 1870 may be multicore fibers, with an ensemble of core regions guiding the source light within the respective core areas of diameter $D_{SA}$ in order to maintain spatial incoherence at suitable levels over long fiber lengths. In various exemplary embodiments, the source fibers 1870 have a clear aperture corresponding to their core diameter $D_{RA}$ such that two or more grating bars of the central grating 1881 can be positioned within the clear aperture area of each source fiber 1870.

The central grating 1881 divides the source light provided by the source fibers 1870 into a plurality of line sources. The line sources, that is, the clear areas of the central grating 1881, are made narrow enough that each line source projects spatially coherent light on the scale grating. For embodiments in which the source fibers 1870 are multicore source fibers, the multiple cores may have spacings and individual dimensions similar to the pitch of the central grating 1881. In such embodiments, instead of acting as a continuous line source, each line source would operate as multiple source points arranged along the line, each source point emanating from an individual core of the ensemble of cores.

In any case, for the fiber-optic readhead arrangement 1800, the central grating 1881 and the remote light source providing the source light for the light source 1880 are chosen and configured such that the source light from each individual line source is spatially coherent and the source light from separate line sources is mutually incoherent. Furthermore, it should be appreciated that the pitch of the central grating 1881 is chosen such that line sources provided will result in respective self images from an operably positioned scale grating such that the respective self images are all mutually "in phase". For embodiments of the fiber-optic readhead arrangement 1800 that are used with amplitude grating scales, the pitch of the central grating 1881 and the phase masks 1720 should be equal to two times the grating pitch of the amplitude grating scale. For embodiments of the fiber-optic readhead arrangement 1800 that are used with phase grating scales, the pitch of the central grating 1881 and the phase masks 1720 should be equal to the grating pitch of the phase grating scale.

Figure 19A:
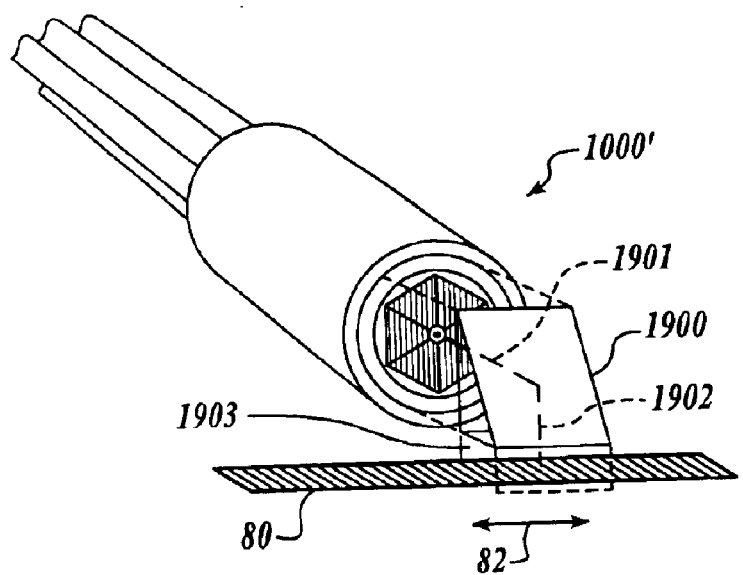
FIG. 19A shows an optical deflector usable in conjunction with various fiber-optic readheads according to this invention in a first orientation relative to a scale grating.

FIG. 19A shows an optical deflector 1900 usable in conjunction with various fiber-optic readheads according to this invention, in a first orientation relative to a scale grating 80. As shown in FIG. 19A, an exemplary optical fiber readhead 1000', similar to the optical fiber readhead arrangement 1000 previously described with reference to FIG. 10, transmits a diverging source light generally along a beam path 1901 to the optical deflector 1900, where it is deflected along a beam path 1902 through an operating gap in the zone 1903 towards a scale grating 80. Similarly, scale light reflecting, diverging and diffracting from the a scale grating 80 is returned to the optical deflector 1900 generally along the beam path 1902 and deflected back towards the the readhead 1000' generally centered along the nominal beam path 1901. The scale grating 80 moves relative to the optical fiber readhead 1000' along the measuring axis direction 82. The returned scale light provides a self image of the scale grating 80 at a self image plane in an illumination field that is generally centered with respect to the fiber-optic receiver channel configuration of the exemplary optical fiber readhead 1000', as previously described with reference to various other exemplary embodiments according to this invention. It should be appreciated that the grating bars of the phase masks of the exemplary optical fiber readhead 1000' are oriented such that they are parallel to the grating lines in the self image of the scale grating 80. It should also be appreciated that the more accurately the deflector 1900 deflects the beam path 1901 relative to a nominal deflection of 90 degrees to become the beam path 1902, and the more accurately the beam path 1902 is made normal to the surface of the scale grating 80, the more accurate and robust will be the resulting position measurement system.

In various exemplary embodiments, the deflector 1900 is a reflecting right angle prism, mirror, or other suitable optical component reliably mounted on a separate member in a fixed relation relative to a fiber optic readhead according to this invention. In order to maintain a short path length operable for self-imaging, and still maintain a practical operating gap relative to the scale grating 80 in the zone 1903, the deflector 1900 is preferably mounted as close as possible to the readhead 1000'. In various exemplary embodiments, the deflector 1900 is properly aligned and attached directly to the readhead 1000'. In various other exemplary embodiments, the deflector 1900 may also act as a substrate to provide a phase mask element according to this invention, having phase masks according to this invention formed directly onto the surface of the deflector 1900 that is positioned towards the readhead 1000'.

In the embodiment shown in FIG. 19A, the optical fiber readhead 1000' is oriented with its long axis transverse to the direction of the measuring axis 82 of the scale grating 80. Either the readhead 1000' or the scale grating 80 may be fixed in position, with the other element moveable. It should be appreciated that it numerous applications it is practical to use of a deflector such as the exemplary deflector 1900 in this manner because of the ultra-miniature size of a fiber optic readhead and encoder according to this invention. It should be appreciated that in numerous applications a deflector such as the exemplary deflector 1900 further enhances the utility of a fiber optic readhead and encoder according to this invention by allowing the fiber optic readhead to be flexibly oriented relative to the scale grating 80 and the measuring axis direction 82, such that the largest and narrowest dimensions of the readhead are oriented in desired directions. It will also be appreciated that use of a deflector such as the exemplary deflector 1900 is beneficial for orienting the route of the optical fibers and/or cables of the readhead 1000' in desired directions.

Figure 19B:
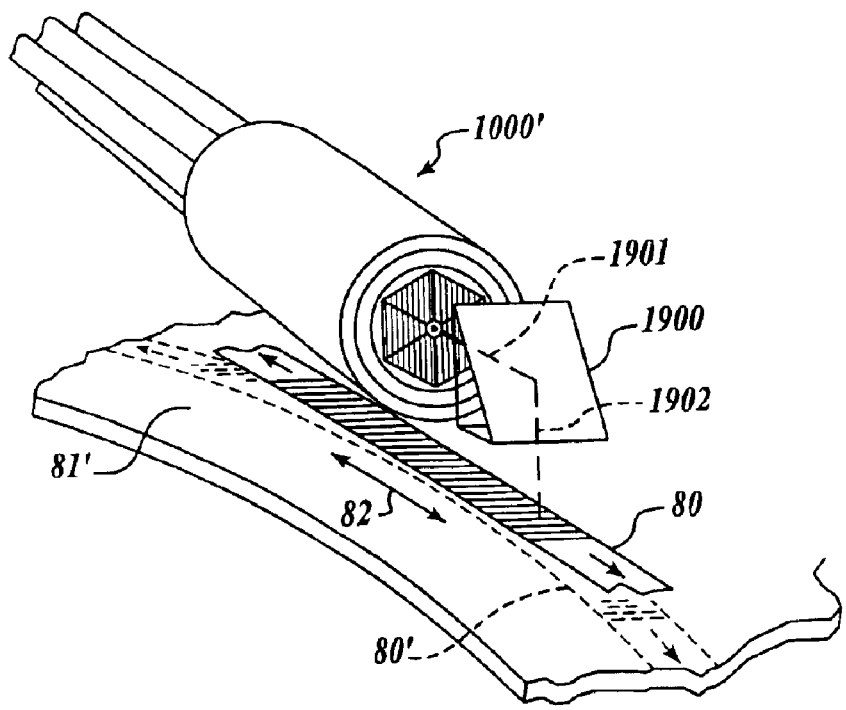
FIG. 19B shows an optical deflector usable in conjunction with various fiber-optic readheads according to this invention in a second orientation relative to exemplary scale gratings.

FIG. 19B shows the optical deflector 1900 used in a second orientation relative to two alternative exemplary scale gratings 80 and 80'. In the second orientation described below, the operation, design considerations, benefits and various alternative embodiments of the optical deflector 1900 are generally the same as previously described with reference to FIG. 19A. However, for this second orientation, the optical fiber readhead 1000' is oriented with its long axis aligned generally parallel to the direction of the measuring axis 82 of the scale grating 80. It should be appreciated that in this second orientation the grating bars of the phase masks of the exemplary optical fiber readhead 1000' are again oriented such that they are parallel to the grating lines in the self image of the scale grating 80. Thus, relative to the first orientation shown in FIG. 19A, the readhead 1000' is rotated 90 degrees about its long axis, that is, about the axis of the path 1901. This second orientation further enhances the utility of the optical fiber readhead 1000' by allowing the flexibility to orient the largest and narrowest dimensions of the optical fiber readhead 1000', and/or its optical fibers and/or cables, in yet other desired directions in various applications.

FIG. 19B also shows an alternative scale grating 80', usable with a variety of optical fiber readheads according to this invention. The scale grating 80' is similar to the scale grating 80, and its measuring axis 82 is the similarly aligned. However, the scale grating 80' forms a "cylindrical" scale conforming to the surface of a cylindrical scale member 81'. It should be appreciated that the curvature of the cylindrical scale grating 80' may slightly disturb the accuracy of the self-image arising from the scale grating 80', and therefore degrade the measuring accuracy to some extent. However, it should be further appreciated that in various exemplary embodiments, the illumination spot on the cylindrical scale grating 80' is quite small, and the resulting self-image is still adequate for many practical applications. In particular, in various exemplary embodiments a cylindrical scale grating 80' having a small grating pitch such as 8 microns and having a cylinder diameter of approximately 25 mm or more, can provide measurement performance comparable to a similar flat scale grating when used with an optical fiber readhead according to this invention. The cylindrical scale grating 80' may be use in conjunction with the optical deflector 1900 or, more generally, as a substitute for any flat scale 80 usable with any other embodiment of an optical fiber readhead shown or described herein.

Figure 20:
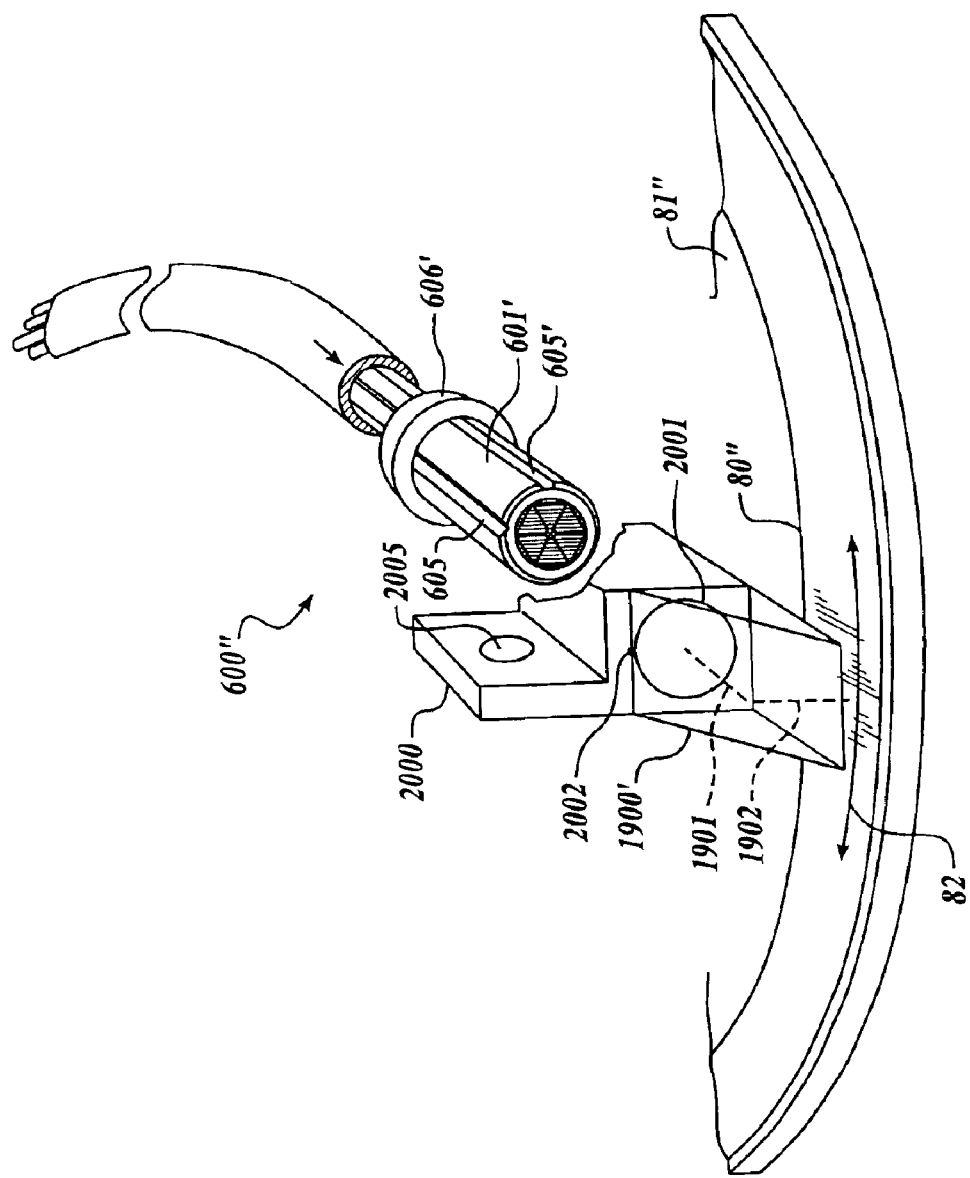
FIG. 20 shows a mounting bracket and optical deflector usable in conjunction with various fiber-optic readheads according to this invention, arranged in a first orientation relative to a rotary scale grating.

FIG. 20 shows a mounting bracket 2000 and an optical deflector 1900' usable in conjunction with various fiber-optic readheads according to this invention, arranged in a first orientation relative to a rotary scale grating 80". FIG. 20 shows a configuration including an exemplary optical fiber readhead 600" similar in to the optical fiber readhead 600' previously described with reference to FIG. 12. The exemplary readhead 600' includes a readhead housing 601' that is the same as the readhead housing 601 shown in FIG. 12, except an additional alignment groove 605' has been added at a position rotated by 90 degrees relative to the alignment groove 605. The ultra-miniature size of exemplary readhead 600' allows for a very efficient mounting scheme, where the readhead 600' can be economically mounted and the effort and time required for adequate alignment relative to the rotary scale grating 80" is minimal.

As shown in FIG. 20 the mounting bracket 2000 includes a fastener hole 2005, a bore 2001, and an alignment ridge 2002. The bore 2001 is sized to provided a snug fit for the diameter of the readhead housing 601'. The alignment ridge 2002 extends the length of the bore 2001 and is aligned and sized to mate with either of the alignment grooves 605 or 605'. The bore 2001 and/or alignment ridge 2002 may be formed during an extrusion process used to fabricate the mounting bracket 2000. Alternatively the bore 2001 and/or alignment ridge 2002 may be drilled and/or broached, and the alignment ridge may be provided by the addition of an appropriately sized dowel or drill blank in a suitable located groove along the bore 2001.

In various exemplary embodiments, the optical deflector 1900' is similar to, or the same as, the optical deflector 1900, previously described. In various exemplary embodiments, the optical deflector 1900' may be properly aligned and attached directly to the mounting bracket 2000, approximately as shown in FIG. 20.

Similarly to the previously described configuration shown in FIG. 19A, the grating bars of the phase masks of the exemplary optical fiber readhead 600" should be oriented such that they are nominally parallel to the grating lines in the self image of the rotary scale grating 80". Thus, for this first orientation as illustrated in FIG. 20, the alignment groove 605 is aligned with the alignment ridge 2002, and the exemplary optical fiber readhead 600" is inserted into the bore 2001 to provide the desired mounting alignment. In various exemplary embodiments, the readhead 600" is inserted until it abuts the optical deflector 1900'. In various other exemplary embodiments, the length of the mounting bracket 2000 and the location of a mounting stop 606' are chosen such that the readhead 600" is inserted until the mounting stop 606' abuts a rear surface of the mounting bracket 2000 and a minimal gap is provided between the phase mask element of the readhead 600" and the optical deflector 1900'. Once inserted, in various exemplary embodiments, in various exemplary embodiments, the readhead 600" may be permanently or temporarily rigidly fixed relative the mounting bracket 2000 by an adhesive or a mechanical fastening method.

In a second orientation relative to the scale grating 80", not illustrated, the optical fiber readhead 600" is oriented with its long axis aligned generally parallel to the direction of the measuring axis 82 of the rotary scale grating 80", and the mounting bracket 2000 is correspondingly rotated about an axis that would be vertical in FIG. 20, such that the bore 2001 is generally parallel to the direction of the measuring axis 82 of the rotary scale grating 80". Similarly to the previously described configuration shown in FIG. 19B, the grating bars of the phase masks of the exemplary optical fiber readhead 600" should be oriented such that they are nominally parallel to the grating lines in the self image of the rotary scale grating 80". Thus, for this second orientation, the other alignment groove 605' is aligned with the alignment ridge 2002, and the exemplary optical fiber readhead 600" is inserted into the bore 2001 to provide the desired mounting alignment. Thus, relative to the first orientation relative to the rotary scale grating 80" shown in FIG. 20, the readhead 600" is rotated 90 degrees about its long axis, that is, about the axis of the path 1901.

A mounting bracket such as the exemplary mounting bracket 2000, used in conjunction with the miniature optical fiber readhead 600', provides a very efficient and versatile mounting scheme, where the readhead 600' can be economically mounted in at least two different orientations and the effort and time required for adequate alignment relative to the rotary scale grating 80" is minimal. It should be appreciated that the mounting bracket 2000 is not limited to use with rotary scale grating configurations. It is also usable in conjunction with any other scale grating configuration shown or described herein.

It should be appreciated that the curvature of the rotary scale grating 80" may slightly disturb the accuracy of the self-image arising from the rotary scale grating 80", and therefore degrade the measuring accuracy to some extent. However, it should be further appreciated that in various exemplary embodiments, the illumination spot on the rotary scale grating 80" is quite small, and the resulting self-image is still adequate for many practical applications. In particular, in various exemplary embodiments a rotary scale grating 80" having a small grating pitch such as 8 microns and having a diameter of approximately 25 mm or more, can provide measurement performance comparable to a similar straight scale grating when used with an optical fiber readhead according to this invention. The rotary scale grating 80" may be use in conjunction with the optical deflector 1900' as shown or, more generally, as a substitute for any straight scale grating 80 usable with any other embodiment of an optical fiber readhead shown or described herein.

With regard to FIGS. 19A, 19B and 20, and their related description, it should be appreciated that the structure of the optical fiber readheads 1000' and 600", the deflectors 1900 and 1900', and the mounting bracket 2000, have been illustrated and described in a simple form, to facilitate clear illustration and clear explanation of their basic utility and operation. However, it should be appreciated that various kinematic mounting, interface, and assembly features (not shown) may be incorporated into any one or more of the optical fiber readheads 1000' and 600", the deflectors 1900 and 1900', and the mounting bracket 2000, to facilitate proper alignment, attachment and mounting according to known kinematic mounting, interface and assembly principles.

While this invention has been described in conjunction with the exemplary embodiments outlined above, it is evident that the embodiments and design factors described above are indicative of additional alternative embodiments, modifications and variations, as will be apparent to those skilled in the art. Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. A device for measuring the relative displacement between two members, the device comprising:
   a scale having a scale grating formed along a measuring axis direction; and
   a readhead operable to provide an operable self-image of the scale, the readhead comprising:
      a light source portion comprising at least one respective light source element; and
      a plurality of fiber-optic receiver channels, each respective fiber-optic receiver channel comprising:
         a respective receiver channel spatial phase mask portion having a respective spatial phase and having its light-blocking elements arranged at a pitch that is operable for spatially filtering the operable self-image of the scale, and generally being located at a nominal spatial phase mask plane that is operable for spatially filtering the operable self-image of the scale; and
         at least one respective receiver channel optical fiber having an input end that receives a respective receiver channel optical signal light;

wherein:
      the respective receiver channel optical signal light received by the at least one respective receiver channel optical fiber comprises optical signal light collected through the respective receiver channel spatial phase mask portion over a respective collected light area having a collected light area dimension along the measuring axis direction that is at least three full periods of the respective receiver channel spatial phase mask portion;
      when the readhead is operably positioned relative to the scale grating at least first and second respective channels of the plurality of fiber-optic receiver channels spatially filter their respective portions of the operable self-image of the scale at the nominal spatial phase mask plane to provide at least first and second respective receiver channel optical signals having at least first and second respective signal phases; and
      the device outputs the at least first and second respective receiver channel optical signals along respective optical fibers to provide relative displacement measurement information in the form of a plurality of respective optical output signals, the respective optical output signals produced without the use of an electronic photodetector element.

2. The device of claim 1 wherein:
   at least one respective light source element emits respective radiation distributed as a respective source light that is directed towards the scale grating, the respective source light having a respective source light central axis, the respective source light diverging about that source light central axis at least proximate to the scale grating to give rise to a respective scale light that is directed towards the nominal spatial phase mask plane, the respective scale light having a respective scale light central axis, the respective scale light diverging about that scale light central axis at least proximate to the scale grating;
   each fiber-optic receiver channel has a respective nominal light-carrying area corresponding to an aggregate light-carrying core area of the at least one respective receiver channel optical fiber and the nominal light-carrying area corresponds to the area of a circle having a circle diameter of at most 2 millimeters; and
   the nominal light-carrying area of each fiber-optic receiver channel has a nominal centroid and at least proximate to the input end of the at least one respective receiver channel optical fiber the nominal centroid is separated from at least one respective scale light central axis by a nominal respective location radius that is at most 8 times the circle diameter corresponding to that nominal light-carrying area.

3. The device of claim 2 wherein the circle diameter of the circle corresponding to the nominal light carrying area is at most 1 millimeter.

4. The device of claim 2 wherein the circle diameter of the circle corresponding to the nominal light carrying area is at most 0.5 millimeters.

5. The device of claim 2 wherein:
   when the readhead is operably positioned relative to the scale grating to provide an operable self-image, for at least one respective scale light a total illumination circle may be defined at the nominal spatial phase mask plane such that at least 95% of the optical power due to that respective scale light is included in that total illumination circle, that total illumination circle has a corresponding total illumination radius $R_{tot}$, and a corresponding illumination field radius R may be defined as $R=(R_{tot}/2.55)$; and when the nominal respective location radius is at least 5 times the circle diameter corresponding to the nominal light-carrying area, the light source portion is configured to distribute a respective source light corresponding to a respective scale light such that the illumination field radius R for that respective scale light at the nominal spatial phase mask plane satisfies the condition that R is at least 0.5 times the nominal respective location radius and less than 1.05 times the nominal respective location radius when the readhead is operably positioned relative to the scale grating according to at least one operable configuration that is specified for the device and that provides an operable self-image.

6. The device of claim 5 wherein when the nominal respective location radius is at least 3 times the circle diameter corresponding to the nominal light-carrying area and less than 5 times that circle diameter, the illumination field radius R at the nominal spatial phase mask plane satisfies the condition that R is at least 0.35 times the nominal respective location radius and less than 2.2 times the nominal respective location radius.

7. The device of claim 6 wherein when the nominal respective location radius is at least 1 times the circle diameter corresponding to the nominal light-carrying area and less than 3 times that circle diameter, the illumination field radius R at the nominal spatial phase mask plane satisfies the condition that R is at least 0.21 times the nominal respective location radius and less than 3.9 times the nominal respective location radius.

8. The device of claim 7 wherein when the nominal respective location radius is less than 1 times the circle diameter corresponding to the nominal light-carrying area, the illumination field radius R at the nominal spatial phase mask plane satisfies the condition that R is at least 0.21 times the nominal respective location radius and less than 10.25 times the nominal respective location radius.

9. The device of claim 2 wherein:

when the readhead is operably positioned relative to the scale grating to provide an operable self-image, for at least one respective scale light a total illumination circle may be defined at the nominal spatial phase mask plane such that at least 95% of the optical power due to that respective scale light is included in that total illumination circle, that total illumination circle has a corresponding total illumination radius $R_{tot}$, and a corresponding illumination field radius R may be defined as $R=(R_{tot}/2.55)$; and the light source portion is configured to distribute a respective source light corresponding to a respective scale light such that the illumination field radius R for that respective scale light at the nominal spatial phase mask plane satisfies the condition that R is at least 0.5 times the nominal respective location radius and less than 1.05 times the nominal respective location radius when the readhead is operably positioned relative to the scale grating according to at least one operable configuration that is specified for the device and that provides an operable self-image, regardless of the ratio between the nominal respective location radius and the circle diameter corresponding to the nominal light-carrying area.

10. The device of claim 2 wherein at least three respective fiber-optic receiver channels of the plurality of fiber-optic receiver channels each have a respective nominal centroid that is separated from a same respective scale light central axis by a nominal respective location radius that is approximately the same for each of the at least three respective fiber-optic receiver channels.

11. The device of claim 2 wherein each light source element comprises a source optical fiber connectable to a remote radiation source that provides radiation operable to produce self-images, the source optical fiber having an output end, at least a portion of the output end emitting the respective radiation.

12. The device of claim 11 wherein each source optical fiber comprises a single-mode optical fiber and the at least a portion of the of the output end that emits the respective radiation comprises a light-carrying core area of the single-mode optical fiber.

13. The device of claim 2 wherein the readhead is configured such that each respective source light central axis is approximately collinear with its corresponding respective scale light central axis when the readhead is nominally aligned relative to the scale grating.

14. The device of claim 1 wherein the readhead is located entirely on a first side of the scale grating, the scale grating includes reflective elements, and respective scale light that is directed towards the nominal spatial phase mask plane comprises light reflected from the scale grating.

15. The device of claim 1 wherein the readhead comprises a transparent mask substrate and each respective receiver channel spatial phase mask portion is fabricated on a surface of the transparent mask substrate with its light-blocking elements positioned along the measuring axis direction with respect to the light-blocking elements of the other receiver channel spatial phase mask portions in a manner that establishes desired relationships between the respective spatial phases of the respective receiver channel spatial phase mask portions.

16. The device of claim 15 wherein the input end of each respective receiver channel optical fiber is nominally positioned against the corresponding respective receiver channel spatial phase mask portion on the surface of the transparent mask substrate.

17. The device of claim 1 wherein the respective collected light area is at least partially determined by at least one of a) an aggregate light-carrying core area proximate to the input end of the corresponding at least one respective receiver channel optical fiber, b) a light receiving area of a miniature lens positioned proximate to the respective receiver channel spatial phase mask portion and proximate to the input end of the at least one respective receiver channel optical fiber and c) a limiting aperture feature of the respective receiver channel spatial phase mask portion.

18. The device of claim 1 wherein the readhead is configured such that the respective receiver channel optical signal light downstream of one respective receiver channel spatial phase mask portion does not intersect with the respective receiver channel optical signal light downstream of a different respective receiver channel spatial phase mask portion prior to being received by the input end of the at least one respective receiver channel optical fiber.

19. The device of claim 1 wherein at least each collected light area and each input end are positioned entirely within a cylindrical volume having an axis perpendicular to the nominal spatial phase mask plane and having a cylinder radius that is at most 3 millimeters.

20. The device of claim 19 wherein the cylinder radius containing at least each collected light area and input end is at most 2.0 millimeters.

21. The device of claim 20 wherein the cylinder radius containing the collected light area and input end is at most 1.25 millimeters.

22. The device of claim 21 wherein the cylinder radius containing the collected light area and input end is at most 0.5 millimeters.

23. The device of claim 19 wherein each respective light source element comprises one of a) an electronic solid-state laser element, at least a portion of the solid-state laser element emitting the respective radiation, b) an electronic solid-state light emitting diode element, at least a portion of the solid-state light emitting diode element emitting the respective radiation and c) a source optical fiber connectable to a remote radiation source that provides radiation operable to produce self-images, the source optical fiber having an output end, at least a portion of the output end emitting the respective radiation.

24. The device of claim 23 wherein:
the readhead is located entirely on a first side of the scale grating;
the scale grating comprises reflective elements; and
at least one respective light source element emits respective radiation distributed as a respective source light that is directed towards the scale grating, the respective source light having a respective source light central axis, the respective source light diverging about that source light central axis at least proximate to the scale grating to give rise to a respective scale light that is reflected towards the nominal spatial phase mask plane, the respective scale light having a respective scale light central axis, the respective scale light diverging about that scale light central axis at least proximate to the scale grating.

25. The device of claim 24 wherein:
the respective source light is distributed toward the scale grating from at least one of a) at least one nominal point source and b) at least one nominal line source comprising a line source slit in a source grating;
each nominal point source and each nominal line source are located proximate to the nominal spatial phase mask plane and the nominal spatial phase mask plane coincides with a surface of a transparent mask substrate, the transparent mask substrate carrying at least each respective receiver channel spatial phase mask portion.

26. The device of claim 24 wherein the respective radiation is emitted from a portion of the light source element that is positioned entirely within the cylindrical volume.

27. The device of claim 26 wherein the readhead is configured such that when the readhead is nominally aligned relative to the scale grating at least one respective source light central axis is oriented to intersect with the scale grating along a direction which is approximately normal to the scale grating plane at the point of intersection such that the at least one respective scale light is reflected along a respective scale light central axis that is nominally collinear with its respective source light central axis.

28. The device of claim 27 wherein:
each respective light source element comprises a source optical fiber, the portion of the output end of the source optical fiber that emits the respective radiation comprising a light-carrying core area at the output end of the source optical fiber;
each fiber-optic receiver channel has a respective nominal light-carrying area corresponding to an aggregate light-carrying core area of the at least one respective receiver channel optical fiber, the respective nominal light-carrying area proximate to the input end of the at least one respective receiver channel optical fiber having a respective nominal centroid; and at least three respective fiber-optic receiver channels of the plurality of fiber-optic receiver channels each have a respective nominal centroid that is separated from a same light-carrying core area at the output end of shared source optical fiber by a nominal respective location radius that is approximately the same for each of the at least three respective fiber-optic receiver channels.

29. The device of claim 28 wherein the respective receiver channel optical fibers corresponding to the at least three respective fiber-optic receiver channels are positioned substantially against the shared source optical fiber at least proximate to the input ends of the respective receiver channel optical fibers and proximate to the output end of the source optical fiber.

30. The device of claim 29 wherein the shared source optical fiber comprises a single mode optical fiber, the portion of the output end of the source optical fiber that emits the respective radiation comprises a single mode core area that operates to provide respective radiation distributed from a nominal point source, and the single mode core area is surrounded by optical fiber material that provides outer dimensions for the source optical fiber that nominally fit in a close-pack fashion with the respective receiver channel optical fibers corresponding to the at least three respective fiber-optic receiver channels that are positioned substantially against the shared source optical fiber.

31. The device of claim 28 wherein:
the at least one respective light source element consists of one source optical fiber; and
the at least three respective fiber-optic receiver channels that each have a respective nominal centroid that is separated from a same light-carrying core area at the output end of the source optical fiber by a nominal respective location radius that is approximately the same for each of the at least three respective fiber-optic receiver channels comprise all of the plurality fiber-optic receiver channels.

32. The device of claim 31 wherein the plurality fiber-optic receiver channels comprise at least 2N respective fiber-optic receiver channels arranged in an arrangement of N operable pairs, where N is an integer equal to at least 2, each operable pair comprising two respective fiber-optic receiver channels arranged on opposite sides of a center of the arrangement of N operable pairs, wherein the two respective spatial phase mask portions corresponding to those two respective fiber-optic receiver channels have one of a) the same spatial phase and b) spatial phases that nominally differ by 180 degrees.

33. The device of claim 27 further comprising a reflective surface, wherein:
the reflective surface is arranged to deflect each respective source light central axis and each respective scale light central axis by approximately 90 degrees at a location along the axes between the readhead and the scale grating; and
the readhead and reflective surface are arranged relative to the scale grating such that the nominal spatial phase mask plane and the operable self-image of the scale grating are nominally perpendicular to the plane of the scale grating.

34. The device of claim 24 wherein the readhead further comprises a readhead housing element that surrounds at least all of the optical fibers included in the readhead, the readhead housing element having a relatively longer outer dimension in a length direction parallel to the axis of the optical fibers and relatively narrower outer dimensions in directions perpendicular to the axis of the optical fibers over at least a portion of its length, and the readhead is constructed such that at least a portion of the length of the readhead can be inserted into a bore having a dimension perpendicular to its central axis that is at least as small as 2.5 millimeters.

35. The device of claim 34 wherein the readhead is assembled into an orientation-maintaining connector that is mechanically interchangeable with at least one standard commercially-available polarization-maintaining optical fiber connector.

36. The device of claim 1 wherein, when there is relative displacement between the readhead and scale grating along the measuring axis direction, each respective optical output signal comprises a sinusoidal function of the relative displacement, and each such sinusoidal function varies from an ideal sinusoidal function by at most 1/32 of the peak-to-peak variation of each such sinusoidal function.

37. The device of claim 36 wherein each such sinusoidal function varies from an ideal sinusoidal function by at most 1/64 of the peak-to-peak variation of each such sinusoidal function.

38. A device for measuring the relative displacement between two members, the device comprising:
a scale having a scale grating formed along a measuring axis direction, the scale grating comprising reflective elements; and
a readhead located entirely on a first side of the scale grating, the readhead operable to provide an operable self-image of the scale, the readhead comprising:
a light source portion comprising at least one respective light source element; and
a plurality of fiber-optic receiver channels, each respective fiber-optic receiver channel comprising:
a respective receiver channel spatial phase mask portion having a respective spatial phase and having its light-blocking elements arranged at a pitch that is operable for spatially filtering the operable self-image of the scale, and generally being located at a nominal spatial phase mask plane that is operable for spatially filtering the operable self-image of the scale; and
at least one respective receiver channel optical fiber having an input end that receives a respective receiver channel optical signal light;
wherein:
the respective receiver channel optical signal light received by the at least one respective receiver channel optical fiber comprises light reflected from the scale grating and collected through the respective receiver channel spatial phase mask portion over a respective collected light area having a collected light area dimension along the measuring axis direction that is at least one full period of the respective receiver channel spatial phase mask portion, such that a respective signal phase corresponding to the respective spatial phase is relatively insensitive to the position of the respective collected light area relative to the light-blocking elements of the receiver channel spatial phase mask portion;
at least each collected light area and each input end are positioned entirely within a cylindrical volume having an axis perpendicular to the nominal spatial phase mask plane and having a cylinder radius that is at most 3 millimeters;
when the readhead is operably positioned relative to the scale grating at least first and second respective channels of the plurality of fiber-optic receiver channels spatially filter their respective portions of the operable self-image of the scale at the nominal spatial phase mask plane to provide at least first and second respective receiver channel optical signals having at least first and second respective signal phases; and
the device outputs the at least first and second respective receiver channel optical signals along respective optical fibers to provide relative displacement measurement information in the form of a plurality of respective optical output signals, the respective optical output signals arising from spatially filtered scale light without the use of an electronic photodetector element.

39. The device of claim 38 wherein the readhead comprises a transparent mask substrate and each respective receiver channel spatial phase mask portion is fabricated on a surface of the transparent mask substrate with its light-blocking elements positioned along the measuring axis direction with respect to the light-blocking elements of the other receiver channel spatial phase mask portions in a manner that establishes desired relationships between the respective spatial phases of the respective receiver channel spatial phase mask portions.

40. The device of claim 39 wherein:
each respective light source element comprises a source optical fiber;
a light-carrying core area at the output end of the source optical fiber emits a radiation that is operable to provide the operable self-image of the scale; and
a light-carrying core area at the output end of the source optical fiber is positioned entirely within the cylindrical volume.

41. A method for operating a device for measuring the relative displacement between two members, the device comprising:
a scale having a scale grating formed along a measuring axis direction, the scale grating comprising reflective elements; and
a readhead located entirely on a first side of the scale grating, the readhead operable to provide an operable self-image of the scale, the readhead comprising:
a light source portion comprising at least one respective light source element;
a transparent mask substrate; and
a plurality of fiber-optic receiver channels, each respective fiber-optic receiver channel comprising:
a respective receiver channel spatial phase mask portion having a respective spatial phase and having its light-blocking elements arranged at a pitch that is operable for spatially filtering the operable self-image of the scale, and generally being located at a nominal spatial phase mask plane that is operable for spatially filtering the operable self-image of the scale; and
at least one respective receiver channel optical fiber having an input end that receives a respective receiver channel optical signal light;
wherein:
each respective receiver channel spatial phase mask portion is fabricated on a surface of the transparent mask substrate with its light-blocking elements positioned along the measuring axis direction with respect to the light-blocking elements of the other receiver channel spatial phase mask portions in a manner that establishes desired relationships between the respective spatial phases of the respective receiver channel spatial phase mask portions;

the respective receiver channel optical signal light received by the at least one respective receiver channel optical fiber comprises light reflected from the scale grating and collected through the respective receiver channel spatial phase mask portion over a respective collected light area having a collected light area dimension along the measuring axis direction that is at least three full periods of the respective receiver channel spatial phase mask portion; and each respective fiber-optic reciver channel has a respective nomial light-carrying area corresponding to an aggregate light-carrying core area of the at least one respective receiver channel optical fiber and the nominal light-carrying area corresponds to the area of a circle having a circle diameter of at most 2 millimeters, the method comprising:

operably positioning the readhead relative to the scale grating;

operating the readhead such that at least one respective light source element emits a respective source light directed towards the scale grating to give rise to at least one respective scale light reflected towards the nominal spatial phase mask plane, the respective scale light including the operable self-image of the scale grating that coincides with a nominal spatial phase mask plane;

receiving the respective scale light including the operable self-image with at least first and second respective channels of the plurality of fiber-optic receiver channels and spatially filtering respective portions of the scale light including the operable self-image at the nominal spatial phase mask plane to provide at least first and second respective receiver channel optical signals having at least first and second respective signal phases; and outputting the at least first and second respective receiver channel optical signals along respective optical fibers to provide relative displacement measurement information in the form of a plurality of respective optical output signals, the respective optical output signals arising from spatially filtered scale light without the use of an electronic photodetector element.

42. The method of claim 41 wherein:

the respective nominal light-carrying area has a respective nominal centroid;

when the readhead is operated to give rise to the at least one respective scale light including the operable self-image of the scale grating:

for at least one respective scale light a total illumination circle may be defined at the nominal spatial phase mask plane such that at least 95% of the optical power due to that respective scale light is included in that total illumination circle, that total illumination circle has a corresponding total illumination radius $R_{tot}$, and a corresponding illumination field radius R may be defined as $R=(R_{tot}/2.55)$; and at least proximate to the input end of at least one respective receiver channel optical fiber the respective nominal centroid is separated from a nominal central axis of at least one respective scale light by a nominal respective location radius, and when the nominal respective location radius is at least 5 times the circle diameter corresponding to the nominal light-carrying area, the step of operably positioning the readhead relative to the scale grating comprises positioning the readhead such that the illumination field radius R for that respective scale light at the nominal spatial phase mask plane satisfies the condition that R is at least 0.5 times the nominal respective location radius and less than 1.05 times the nominal respective location radius.

43. The method of claim 42 wherein when the nominal respective location radius is at least 3 times the circle diameter corresponding to the nominal light-carrying area and less than 5 times that circle diameter, the step of operably positioning the readhead relative to the scale grating further comprises positioning the readhead such that the illumination field radius R at the nominal spatial phase mask plane satisfies the condition that R is at least 0.35 times the nominal respective location radius and less than 2.2 times the nominal respective location radius.

44. The method of claim 43 wherein when the nominal respective location radius is at least 1 times the circle diameter corresponding to the nominal light-carrying area and less than 3 times that circle diameter, the step of operably positioning the readhead relative to the scale grating further comprises positioning the readhead such that the illumination field radius R at the nominal spatial phase mask plane satisfies the condition that R is at least 0.21 times the nominal respective location radius and less than 3.9 times the nominal respective location radius.

45. The method of claim 44 wherein when the nominal respective location radius is less than 1 times the circle diameter corresponding to the nominal light-carrying area, the step of operably positioning the readhead relative to the scale grating further comprises positioning the readhead such that the illumination field radius R at the nominal spatial phase mask plane satisfies the condition that R is at least 0.21 times the nominal respective location radius and less than 10.25 times the nominal respective location radius.

46. The method of claim 41 wherein:

the respective nominal light-carrying area has a respective nominal centroid;

when the readhead is operated to give rise to the at least one respective scale light including the operable self-image of the scale grating:

for at least one respective scale light a total illumination circle may be defined at the nominal spatial phase mask plane such that at least 95% of the optical power due to that respective scale light is included in that total illumination circle, that total illumination circle has a corresponding total illumination radius $R_{tot}$, and a corresponding illumination field radius R may be defined as $R=(R_{tot}/2.55)$; and at least proximate to the input end of at least one respective receiver channel optical fiber the respective nominal centroid is separated from a nominal central axis of at least one respective scale light by a nominal respective location radius, and the step of operably positioning the readhead relative to the scale grating comprises positioning the readhead such that the illumination field radius R for that respective scale light at the nominal spatial phase mask plane satisfies the condition that R is at least 0.5 times the nominal respective location radius and less than 1.05 times the nominal respective location radius, regardless of the ratio between the nominal respective location radius and the circle diameter corresponding to the nominal light-carrying area.

* * * * *

UNITED STATES PATENT AND TRADEMARK OFFICE
CERTIFICATE OF CORRECTION

PATENT NO. : 6,906,315 B2
DATED : June 14, 2005
INVENTOR(S) : J.D. Tobiason

It is certified that error appears in the above-identified patent and that said Letters Patent is hereby corrected as shown below:

Column 38,
Line 12, "portion of the of the outlet" should read -- portion of the outlet --.

Column 40,
Lines 37 and 39, "plurality fiber-" should read -- plurality of fiber- --.

Column 43,
Line 10, "reciver" should read -- receiver --.
Line 11, "nomial" should read -- nominal --.
Line 15, "millimeters," should read -- millimeters; --.

Column 44,
Line 54, "radius, and" should read -- radius; and --.

Signed and Sealed this

Twenty-seventh Day of December, 2005

JON W. DUDAS
*Director of the United States Patent and Trademark Office*